United States Patent [19]
Uchida et al.

[11] Patent Number: 5,706,849
[45] Date of Patent: Jan. 13, 1998

[54] FLOW CONTROL VALVE

[75] Inventors: Yukio Uchida, Atsugi; Norihiro Saita, Isehara, both of Japan

[73] Assignee: Unisia Jecs Corporation, Atsugi, Japan

[21] Appl. No.: 675,116

[22] Filed: Jul. 3, 1996

[30] Foreign Application Priority Data

| Jul. 7, 1995 | [JP] | Japan | 7-194080 |
| Nov. 14, 1995 | [JP] | Japan | 7-318458 |
| Nov. 20, 1995 | [JP] | Japan | 7-325181 |
| Apr. 10, 1996 | [JP] | Japan | 8-112179 |

[51] Int. Cl.$^6$ .................................................. G05D 7/00
[52] U.S. Cl. ........................................ 137/115.09; 137/115.1
[58] Field of Search ............................. 137/115.09, 115.1

[56] References Cited

U.S. PATENT DOCUMENTS

| 2,748,711 | 6/1956 | Drude . | |
| 4,361,166 | 11/1982 | Honaga et al. | 137/117 |
| 4,768,540 | 9/1988 | Mochizuki et al. | 137/115.1 |

FOREIGN PATENT DOCUMENTS 0 658 468  6/1995  European Pat. Off. .

6-8840  1/1994  Japan .

*Primary Examiner*—Gerald A. Michalsky
*Attorney, Agent, or Firm*—Foley & Lardner

[57] ABSTRACT

In a flow control valve, a valve spool is movable for variably controlling an opening area of a port portion of a drain passage so that a necessary flow rate of fluid is conducted from a first pressure chamber to an outlet passage through a control orifice while a surplus flow rate of fluid is returned from the first pressure chamber to the drain passage. A movable sleeve is installed in a valve spool accommodation hole and around the valve spool. The movable sleeve has through holes communicable with the drain passage and an inlet passage, respectively. The movable sleeve has a first axial end portion disposed in the first pressure chamber and a second axial end portion disposed in a low pressure chamber. A spring is disposed in the low pressure chamber for urging the movable sleeve toward the first pressure chamber side. The movable sleeve is movable relative to the valve spool in response to a variation of pressure in the first pressure chamber for varying the opening area of the port portion of the drain passage.

15 Claims, 16 Drawing Sheets

FLOW CONTROL VALVE

BACKGROUND OF THE INVENTION

1. Field of the Invention

The present invention relates to a flow control valve for use in an automotive power steering system, etc. for controlling the flow rate of pressurized working fluid to be supplied from a power source to an actuator of a power steering system, etc.

2. Description of the Related Art

In a power steering system for assisting a manual steering effort or operation, a pump which is driven by an internal combustion engine of a vehicle, is usually used as a power source for supplying pressurized working oil or fluid to the power steering system. However, the power steering system is generally required to be capable of producing a sufficiently large steering operation assisting force at low-speed running or stoppage of a vehicle, i.e., at low engine speed and is not required to produce a large steering operation assisting force at high-speed running from a safety driving point of view since the frictional resistance of road surface to tire becomes smaller at high-speed running. Accordingly, a power source that increases its output in proportion to engine speed, cannot be used unless it is provided with necessary adaptations or modifications.

Thus, a power steering system is generally provided with a flow control valve for controlling the flow rate of working fluid or oil to be supplied to the power steering system in such a manner that all of the discharge of a pump is supplied to the power steering system at idling or at low engine so as to obtain a sufficiently large assist power for assisting a steering effort and restrictedly at an engine speed exceeding a predetermined value, by using a restriction and by returning a surplus of discharge to a fluid reservoir.

Further, a flow control valve has recently be proposed which is adapted to increase the surplus of working fluid and thereby decrease the flow rate of working fluid to be supplied to the power steering system when the steering wheel is in a neutral position where it does not require any steering operation assisting force, for the purpose of saving energy.

This kind of flow control valve is disclosed, for example, in Japanese patent provisional publication No. 6-8840. The flow control valve includes a valve spool slidably accommodated within a valve spool accommodation hole and defining first and second pressure chambers within the valve spool accommodation hole. The first pressure chamber is communicated with an inlet passage, an outlet passage, the inlet passage being communicated with the outlet passage by way of the first pressure chamber and a control orifice, and a drain passage leading to a low pressure side. The pressure in the outlet passage is conducted to the second pressure chamber, and a spring for urging the valve spool toward the first pressure chamber side is disposed within the second pressure chamber. By this, a necessary flow rate of fluid is conducted to the outlet passage by way of the control orifice, and the surplus of working fluid is determined depending upon the necessary flow rate of fluid and returned to the drain passage. Opening and closing of the drain passage is controlled by the valve spool. A bypass valve which is responsive to the pressure within the outlet passage is provided. When the pressure on the outlet passage side becomes lower in response to the steering operation for holding the steering wheel at the neutral position (i.e., holding a power steering system in an inoperative state), the bypass valve establishes communication between the above described second pressure chamber and the low pressure side, to increase the opening area of the drain passage and decrease the flow rate of fluid to be supplied to the power steering system.

Such a prior art valve is adapted to communicate, by means of the bypass valve, the inside of the second pressure chamber with the low pressure side, to move the valve spool and lower the flow rate of fluid in the outlet passage.

In the meantime, the above described second pressure chamber is adapted to receive the pressure from the outlet passage, that is, the pressure of the fluid having passed the orifice is introduced to the second pressure chamber. So, when the second pressure chamber is communicated with the low pressure side, the working fluid having passed the control orifice is drained to the low pressure side. Accordingly, even when the actuator of the power steering system is in an inoperative state, a portion of the working fluid is allowed to pass through the control orifice. Due to this, the pump is required to maintain a predetermined discharge pressure so that the working fluid can pass through the control orifice and maintaining the predetermined pressure is inefficient. As a result, the prior art flow control valve is still defective from an energy saving point of view.

SUMMARY OF THE INVENTION

According to an aspect of the present invention, there is provided a flow control valve which comprises a housing having a valve spool accommodation hole, a movable sleeve slidable in the valve spool accommodation hole, a valve spool slidable in the movable sleeve and cooperating with the movable sleeve to divide the valve spool accommodation hole into a first pressure chamber and a second pressure chamber, means for defining an inlet passage, a control orifice, an outlet passage and a drain passage which are communicated with the first pressure chamber in such a manner that the outlet passage communicates with the first pressure chamber by way of the control orifice, first biasing means for urging the valve spool toward the first pressure chamber, the valve spool being movable for variably controlling an opening area of a port portion of the drain passage so that a necessary flow rate of working fluid is supplied from the inlet passage to the outlet passage by way of the first pressure chamber and the control orifice while a surplus of working fluid is returned from the first pressure chamber to the drain passage, the movable sleeve having a radial through hole for variably controlling communication between the port portion of the drain passage and the first pressure chamber, means for defining a low pressure chamber axially aligned with the valve spool accommodation hole and located next to the second pressure chamber, the movable sleeve having a first axial end portion disposed in the first pressure chamber and a second axial end portion opposite to the first axial end portion and disposed in the low pressure chamber, and second biasing means for urging the movable sleeve toward the first pressure chamber so that the movable sleeve is movable relative to the valve spool in response to a variation of pressure in the first pressure chamber for varying the opening area of the port portion of the drain passage determined by the valve spool. The movable sleeve can be made of metal or a synthetic resinous material. Further, since the movable sleeve is adapted to move relative to the valve spool accommodation hole and the valve spool, a coating of lubricant such as molybdenum disulfide or fluororesin can arbitrarily be applied to the movable sleeve to decrease the sliding resistance.

With the above structure, working fluid discharged from a pump is conducted through the inlet passage to the first pressure chamber. The fluid flow introduced into the first pressure chamber is then divided into a restricted fluid flow which passes through the control orifice and a surplus fluid flow which is returned from the first pressure chamber to a reservoir through the drain passage, though the surplus fluid flow is caused only when the port portion of the drain passage is opened by the valve spool which moves based upon the pressure differential across the control orifice. By this, under restriction by the control orifice, a necessary discharge of working fluid is conducted from the outlet passage to an actuator, e.g., to an actuator of a power steering system to produce a necessary steering operation assisting force.

In this connection, according to the present invention, the movable sleeve having the through holes communicable with the inlet passage and the drain passage is installed in the valve spool accommodation hole at a location outside or around the valve spool. Further, the movable sleeve has a first axial end portion associated with the first pressure chamber and a second axial end portion associated with the low pressure chamber, and is urged by the second biasing means toward the first pressure chamber side. Accordingly, when the pressure in the first pressure chamber is low, the movable sleeve is urged by the first biasing means toward the first pressure chamber side to assume a position where the through hole thereof is substantially in alignment with the drain passage. When the pressure in the first pressure chamber becomes higher, the valve spool is caused to move toward the second pressure chamber side against the bias of the first biasing means and cooperates with the valve spool to perform fluid control. However, even when the movable sleeve is moved into a position toward the second pressure chamber side under the urge of the pressure in the first pressure chamber, the through hole of the movable sleeve is kept communicated with the drain passage.

That is, when the pressure in the first pressure chamber is low, the movable sleeve is positioned under the urge of the first biasing means to make the through hole be substantially in alignment with the inlet passage and the drain passage. The valve spool is thus movable based on a biasing force or spring force of the first biasing means and the pressure differential across the control orifice, so that the flow rate of fluid passing through the control orifice in this operating condition is represented by the line A-B of the graph of FIG. 3.

When the pressure in the second pressure chamber becomes higher, the movable sleeve is caused to move by the pressure in the first pressure chamber toward the second pressure chamber side against the bias of the first biasing means. By this, the through hole of the movable sleeve is moved toward the second pressure chamber side, but is held communicated with the drain passage. That is, the relative position of the through hole of the movable sleeve with respect to the valve spool is varied. By this, the valve spool for maintaining the pressure differential across the control orifice, is caused to move correspondingly to compress the control spring further. Accordingly, the flow rate of fluid in this operating condition is represented by the line B-C of the graph of FIG. 3.

When the pressure in the first pressure chamber rises up to a predetermined value, the movable sleeve is positioned most distant from the first pressure chamber and the through hole thereof is positioned nearest to the second pressure side. Under this condition, the valve spool performs fluid control in accordance with the first biasing means and the pressure differential across the control orifice, so that the flow rate of fluid passing through the control orifice in this operating condition is represented by the line C-D in the graph of FIG. 3. This is the maximum flow rate to be supplied to the actuator, and normally the flow control is performed to obtain this flow rate.

On the other hand, in an inoperative condition of the actuator (e.g., when the steering wheel is in the neutral position), the working fluid pressure in the outlet passage becomes lower, so the pressure in the second pressure chamber becomes lower. Accordingly, the valve spool is moved toward the second pressure chamber side against the bias of the first biasing means in order to maintain the pressure differential across the control orifice, and increases an opening area of the through hole in communication with the drain passage. By this, most of the working fluid conducted through the inlet passage to the first pressure chamber is caused to flow into the drain passage, so the pressure inside the pump (i.e., pump discharge pressure) is lowered and the work of the pump can be decreased.

Simultaneously, the pressure in the outlet passage becomes lower since the actuator is in the inoperative state. The valve spool thus increases the opening area of the through hole in communication with the drain passage, thus causing the pressure in the first pressure chamber to become lower. By this, the movable sleeve which is subjected to the pressure in the first pressure chamber, is caused to move toward the first pressure chamber side under the urge of the second biasing means.

Accordingly, in the case the valve spool is in the position corresponding to the pressure differential across the control orifice, i.e., in the position where the force resulting from the pressure in the first pressure chamber is balanced with the force resulting from the pressure in the second pressure chamber plus the biasing force of the first biasing means, the position of the through hole relative to the valve spool is varied by the amount corresponding to movement of the movable sleeve toward the first pressure chamber side. By this, the opening area of the through hole of the movable sleeve, which through hole is in communication with the drain passage and opened by the valve spool, increases further.

By this, the working fluid supplied to the first pressure chamber is returned through the through hole of an increased opening area and the drain passage to the inlet side of the pump and the reservoir, whereby the pump which discharges working fluid and delivers it to the first pressure chamber through the inlet passage is caused to decrease the discharge pressure, thus decreasing the work of the pump and therefore making it possible to save energy with efficiency.

In this instance, the movable sleeve is caused to move by the balancing of the biasing force of the second biasing means and the force resulting from the pressure in the first pressure chamber, acting thereon, and varies the position of the drain passage relative to the valve spool. Accordingly, there is no portion of the discharge of the pump that is passed through the control orifice for movement of the movable sleeve, so there is no necessity of maintaining the discharge pressure of the pump at a predetermined pressure, thus making it possible to eliminate wasteful consumption of energy and attain energy saving.

According to another aspect of the present invention, the flow control valve further comprises control means for variably controlling a movable range of the movable sleeve toward the second pressure side. When the pressure in the first pressure chamber rises up to a predetermined value, the movable sleeve is positioned most distant from the first pressure chamber and the through holes thereof are positioned nearest to the second pressure side. This movement of the movable sleeve toward the second pressure chamber side is controlled by the control means. Under this condition, the valve spool performs fluid control in accordance with the first biasing means and the pressure differential across the control orifice, and the flow rate of fluid passing through the control orifice is regulated to a maximum value. Usually, this maximum flow rate of fluid is supplied to the actuator. The maximum flow rate of fluid supplied to the actuator can be varied by varying the moved position (stop position) of the movable sleeve, and the moved position (stop position) is controlled by the control means. The control means can be attained by, for example, a control pin which the movable sleeve is abuttingly engaged with, and a solenoid or motor for driving the control pin. Accordingly, when the movable sleeve is stopped at a predetermined position under control of the control means, the flow rate of fluid passing through the control orifice is represented by the line C-D of the graph of FIG. 7. Further, when the movable sleeve is stopped at a position which is located nearer to the first pressure chamber than the above described predetermined position under the control of the control means, the opening area of the through hole in communication with the drain passage is increased a little, so the flow rate of fluid to be drained increases and the flow rate of fluid passing through the control orifice in this condition is represented by the line E-F of the graph of FIG. 7. Accordingly, by controlling the operation of the control means in accordance with, for example, a signal representative of a vehicle running condition such as vehicle speed, it becomes possible to supply a maximum flow rate of fluid to an actuator of a power steering system for obtaining a sufficiently large steering operation assisting force at low speed or stoppage of a vehicle, while on the other hand to decrease the flow rate of fluid to be supplied to the actuator for thereby decreasing the steering operation assisting force and obtaining driving and steering stability at high-speed running of a vehicle in which the frictional resistance of road surface to tire is small. That is, the maximum flow rate of fluid can be variably and arbitrarily controlled by the control means, so the flow rate of fluid can be controlled optimally in accordance with vehicle speed.

According to a further aspect of the present invention, the flow control valve further comprises means for defining a second control orifice which is disposed in parallel with said first mentioned control orifice. The first mentioned control orifice is fixed in opening area and serves as a main orifice. The second control orifice is variable in opening area in response to flow rate of fluid in the inlet passage and serves as a sub-orifice. The relation between flow rate of fluid passing through a control orifice unit consisting of a main orifice and a sub-orifice and pump internal pressure (pump discharge pressure) is depicted by the lines A-B, B-C and C-D of the graph of FIG. 11. This characteristic is substantially similar to that described as above. In this connection, the lines a-b, b-c and c-d represent the performance characteristic which are obtained when the speed of rotation of an associated pump is high. Further, the relation between flow rate of fluid passing through a control orifice unit consisting of a main orifice and a sub-orifice and rotation speed of the pump is depicted by the lines in the graph of FIG. 12. That is, when the pump is driven to rotate at high speed to increase its output, the flow rate of fluid conducted to the inlet passage is increased. Depending upon the increasing flow rate of fluid, the sub-orifice of the control orifice unit is caused to decrease in opening area gradually. By this, the flow rate of fluid passing through the control orifice unit consisting of the main orifice and the sub-orifice is caused to decrease gradually as represented by the line D-E in FIG. 12 (or by d-e when the pump internal pressure is low). When the output of the pump increases further, the sub-orifice disposed in parallel with the main orifice is closed. Accordingly, the control orifice unit is actually constituted by only the main orifice and therefore reduced in actual opening area. The flow rate of fluid passing through the control orifice unit in this operating condition is represented by the line E-F of the graph of FIG. 12 (or by e-f when the pump internal pressure is low). By this, it becomes possible to supply, at low-speed running or at stoppage of a vehicle, a maximum flow rate of fluid to an actuator of a power steering system for thereby obtaining a sufficiently large steering operation assisting force, while supplying, at high-speed running in which the resistance of pavement to tire is small, a decreased flow rate of fluid to the actuator, though the output of the pump is increased, for thereby decreasing the steering operation assisting force and obtaining steering or driving stability. Further, when the output of the pump is increased, the flow rate of fluid passing through the actuator is decreased, so the temperature rise of the working fluid is prevented effectively and the life of working fluid, i.e., the time until it is deteriorated or degraded, can be elongated.

According to a further aspect of the present invention, the flow control valve further comprises third biasing means which cooperates with the second biasing means for applying to the movable sleeve a biasing force which varies stepwisely in response to movement of the movable sleeve toward the second pressure chamber. The second and third biasing means can produce a stepwisely varying biasing force in accordance with movement of the valve spool and can be comprised of two concentrically disposed, inner and outer springs for producing a spring force that varies in two steps or can be comprises of a plurality of spring members which are combined to produce a spring force that varies in multiple steps. In this connection, the spring member can be a coil spring formed from any one of various materials, rubber spring or any kind of spring member. The operation of the flow control valve will be described when the second and third spring means is of the kind that can produce a biasing force that varies in two steps. When the pressure in the first pressure chamber is low, the flow rate of fluid passing through the control orifice is represented by the line A-B of the graph of FIG. 18. In this connection, the movable sleeve is urged toward the first pressure chamber side by a minimum biasing force which is applied thereto from the second and third biasing means. When the pressure in the first pressure chamber increases, a little larger biasing force is applied from the second and third biasing means to the movable spool. The flow rate of fluid passing through the control orifice in this operating condition is represented by the line B-C of the graph in FIG. 18. In this instance, the second and third biasing means are conditioned to produce a spring force in a first stage. During the time until the pressure in the first pressure chamber increases up to a predetermined value to cause the second and third biasing means to produce a spring force in a stage next to the first stage, the movable sleeve is in the condition in which the pressure in the first pressure chamber and the spring force in the first stage are balanced with each other and the through holes of the movable sleeve are held in communication with the inlet passage and the drain passage, respectively. Under this condition, the spool valve is moved based upon the biasing force of the first biasing means and the pressure differential across the control orifice in such a manner as to regulate the pressure differential across the control orifice to a constant value. The flow rate of fluid passing through the control orifice in this operating condition is represented by the line C-D of the graph of FIG. 18. In this instance, the second and third biasing means are conditioned to produce a maximum biasing force in the first state. When the pressure in the first pressure chamber increases further, to cause a resulting force acting on the movable sleeve to exceed beyond the maximum spring force in the first stage, the movable sleeve is moved against the biasing force of the second and third biasing means in the next stage and is moved away from the first pressure chamber. Accordingly, the valve spool is caused to compress the first biasing means further to regulate the pressure differential across the control orifice to a constant value, so that the load on the first biasing means is increased further. Due to this, the valve spool is moved based on the further increased biasing force of the first biasing means and the pressure differential across the control orifice. The flow rate of fluid passing through the control orifice in this operating condition is represented by the line D-E of the graph of FIG. 18. In this instance, the second and third biasing means for urging the movable sleeve are conditioned to produce a biasing force in the stage next to the first stage. When the pressure in the first pressure chamber rises up to a predetermined value, the movable sleeve is positioned most distant from the first pressure chamber and the through holes are positioned nearest to the second pressure chamber side. Under this condition, the valve spool performs flow control in response to the biasing force of the first biasing means and the pressure differential across the control orifice. The flow rate of fluid passing through the control orifice in this operating condition is represented by the line E-F of the graph of FIG. 18. The flow rate obtained in this operating condition is the maximum one supplied to the actuator. In this instance, the second and third biasing means are conditioned to produce maximum one of biasing forces which are applied stepwisely upon the movable sleeve.

The above structure of the present invention can solve the above noted problems inherent in the prior art valve.

It is accordingly an object of the present invention to provide a novel and improved flow control valve which can eliminate a wasteful energy consumption of an associated pump and thereby save energy with efficiency.

It is another object of the present invention to provide a novel and improved flow control valve of the above described character which can easily variably control a maximum flow rate of fluid to be supplied to an associated actuator in accordance with vehicle speed.

DETAILED DESCRIPTION OF THE PREFERRED EMBODIMENTS

Figure 1:
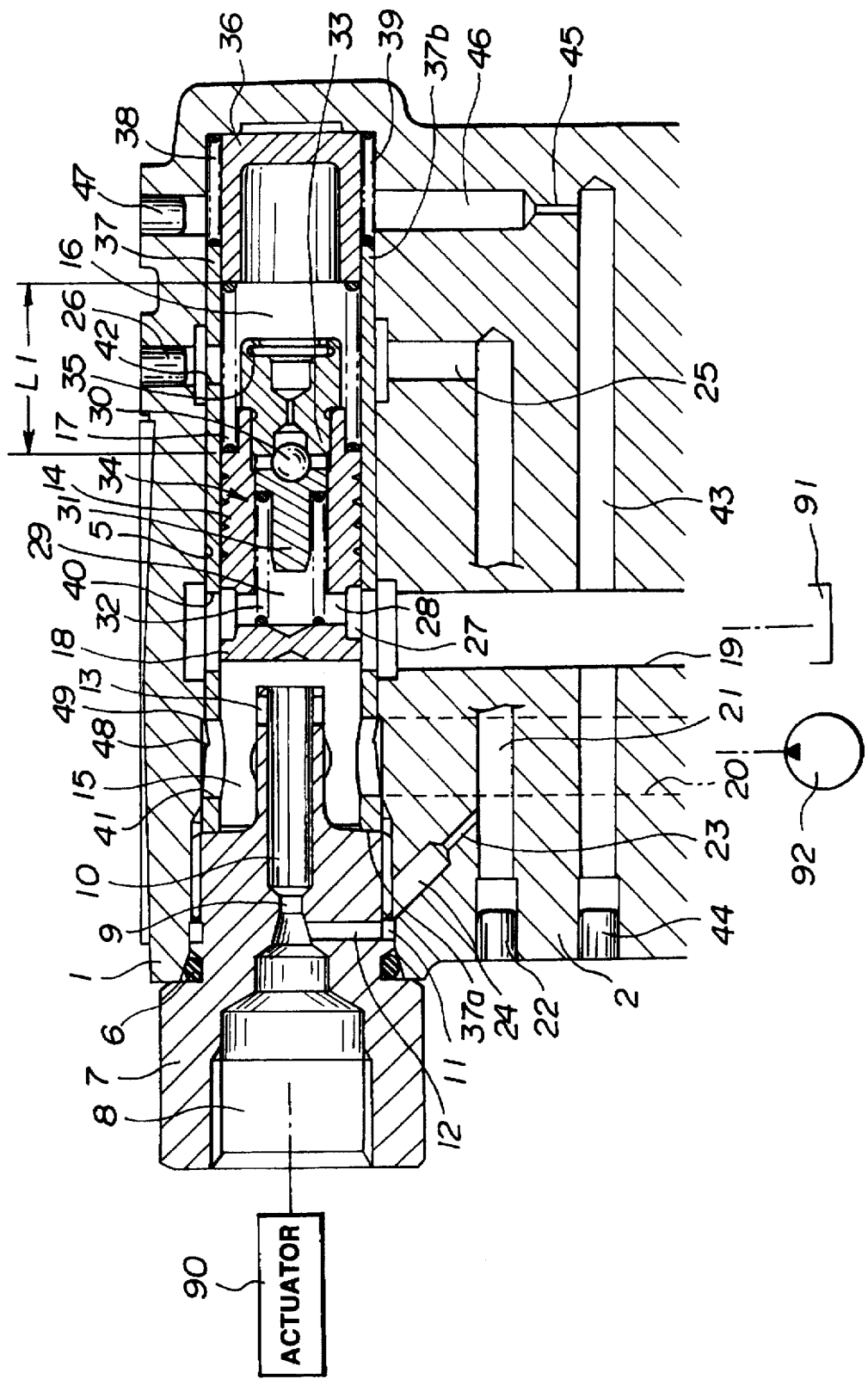
FIG. 1 is a sectional view of a flow control valve according to an embodiment of the present invention.
Figure 2:
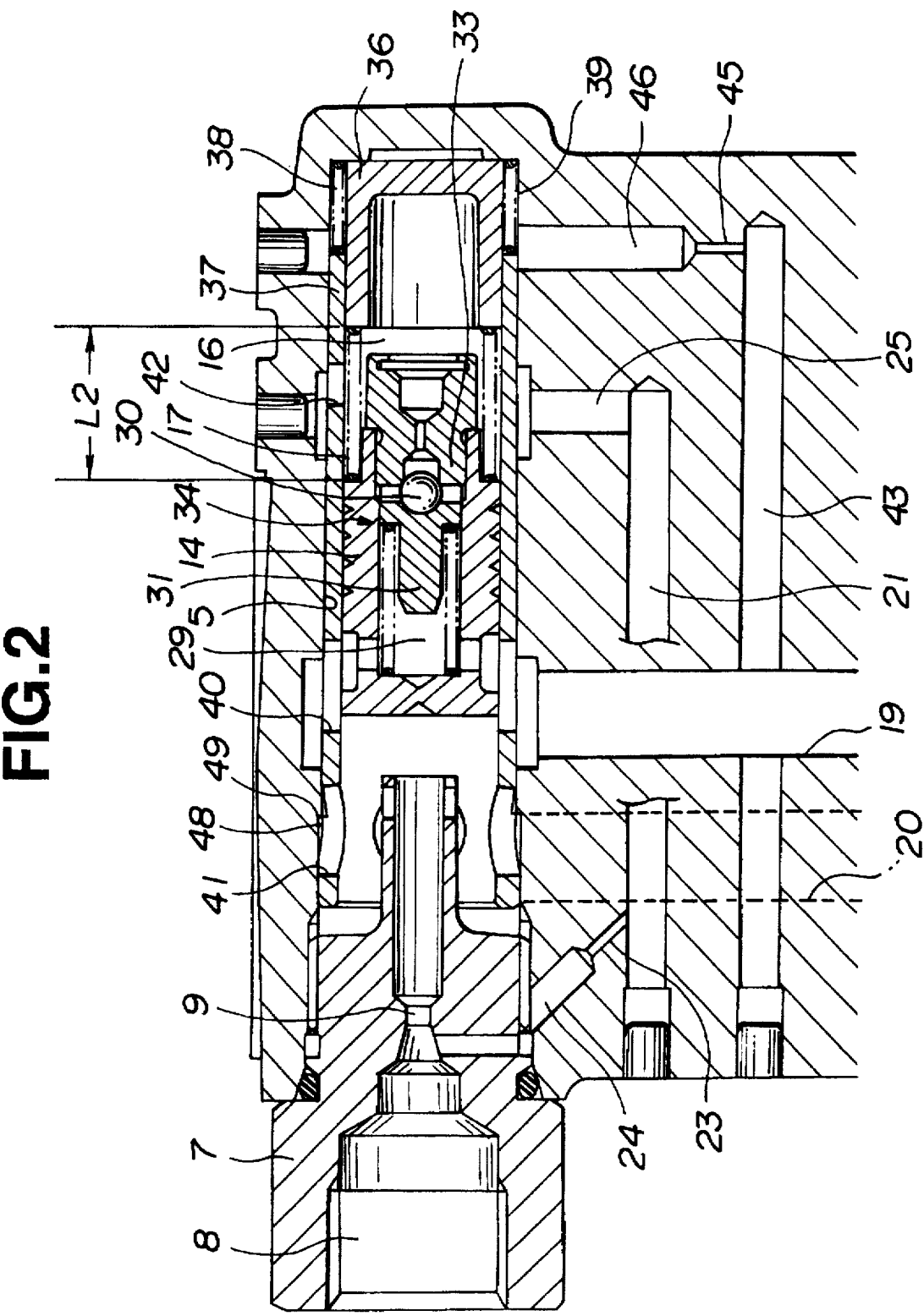
FIG. 2 is a view similar to FIG. 1 but shows the flow control valve in a different operating condition.
Figure 3:
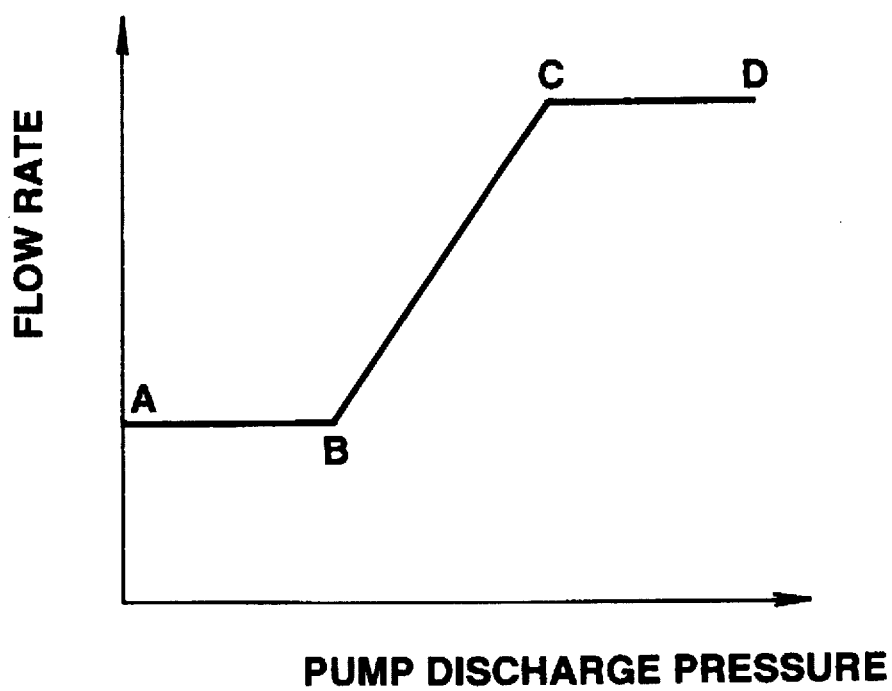
FIG. 3 is graph depicting a flow control characteristic of the flow control valve of FIG. 1.

Referring first to FIGS. 1 to 3, a flow control valve according to an embodiment of the present invention will be described. The flow control valve includes a housing 1 which is integral with a pump body 2. The housing 1 is formed with a valve spool accommodation hole 5 which is closed at one end. An open end of the valve spool accommodation hole 5 is sealingly closed by means of a connector 7 which is screwed into the housing 1 by interposing therebetween a seal ring 6.

The connector 7 has an outlet passage 8 in communication with an actuator 90 of a power steering system. The connector 7 is further provided with a control orifice 9 and a passage 10 for providing communication between the outlet passage 8 and the inside of the valve spool accommodation hole 5. Further, the connector 7 is provided with a peripheral groove 11 and a radial through hole 12 having a radially outer end in communication with the peripheral groove 11 and a radially inner end in communication with the outlet passage 8. Further, the connector 7 has, at a portion adjacent an end where the passage 10 has an open end opening into the inside of the valve spool accommodation hole 5, a pair of diametrically opposed radial openings 13 in communication with the passage 10.

Within the valve spool accommodation hole 5 whose open end is closed by the connector 7, a valve spool 14 is slidably disposed. The valve spool 14 cooperates with a movable sleeve 37 which will be described in detail hereinafter, to divide the valve spool accommodation hole 5 into a first pressure chamber 15 and a second pressure chamber 16. The valve spool 14 is always urged toward the first pressure chamber 15 side by means of a control spring 17 disposed within the second pressure chamber 16. The valve spool 14 is thus always urged to close, at a land portion 18, a drain passage 19 in communication with a reservoir 91, more specifically, a through hole 40 in communication with the drain passage 19 and formed in the movable sleeve 37. Further, the first pressure chamber 15 is communicated with an inlet passage 20 for conducting thereto working fluid discharged by a pump 92 and a through hole 41 formed in the movable sleeve 37.

Indicated by 21 is a passage in the form of a blind hole and nearly in parallel to the valve spool accommodation hole 5. The passage 21 is sealingly closed by a plug 22 and has an end communicated through a pressure sensitive orifice 23 and an inclined hole 24 with the peripheral groove 11 and an end communicated through a passage 25 with the second pressure chamber 16. The passage 25 extends radially of the second pressure chamber 16 and has an open end which is closed by a plug 26.

The valve spool 14 has a peripheral groove 27 associated with the drain passage 19, a radial through hole 28 opening at radially outer ends thereof into the peripheral groove 27, and an axial blind hole 29 communicated with the radial through hole 28 and having an open end associated with the second pressure chamber 16. Disposed within the blind hole 29 is a relief valve 34 including a ball valve 30, a pusher 31, a check spring 32 and a hollow plug 33. The plug 33 is fixedly attached to the open end of the blind hole 29. The ball valve 30 is placed on a valve seat of the plug 33 and urged against the valve seat by the pusher 33. The check spring 32 urges the pusher 31 toward the ball valve 30. An excess of pressure in the outlet passage 8 is conducted through the pressure sensitive orifice 23 to the second pressure chamber 16 and relieved by the relief valve 34. In the meantime, indicated by 35 is a filter attached to the second pressure chamber-side end of the hollow plug 33.

A spring seat 36 is provided for supporting a control spring 17. The spring seat 36 has a hollow cylindrical cup-like shape and is installed in a blind end portion of the valve spool accommodation hole 5 to form thereabound an annular space which will be described hereinafter. The above described movable sleeve 37 is hollow, cylindrical and is installed in the valve accommodation hole 5 and outside or around the valve spool 14, that is, the valve spool 14 is slidably installed in the valve spool accommodation hole 5 by interposing therebetween the movable sleeve 37. The movable sleeve 37 has a first axial end portion 37a disposed in the first pressure chamber 15 and a second axial end portion 37b opposite the first axial end portion 37a and disposed in a low pressure chamber 39 which is the above described annular space formed around the spring seat 36. A spring 38 is disposed in the low pressure chamber 39 to urge the movable sleeve 37 toward the first pressure chamber 15 side.

The movable sleeve 37, as described hereinbefore, has a through hole 40 in communication with the drain passage 19, a through hole 41 in communication with the inlet passage 20, and a through hole 42 in communication with the passage 25. The through holes 40, 41 and 42 are positioned to be substantially in alignment with the drain passage 19, the inlet passage 20 and the passage 25, respectively, when the movable sleeve 37 is moved toward the first pressure chamber 15 side under the bias of the spring 38 and held in contact at the first end portion 37a with the connector 7.

Indicated by 43 is a passage formed in the housing 1. The passage 43 is in the form of a blind hole and extends across the above described blind hole 19. The passage 43 has an open end which is closed by a plug 44 and a blind end communicated with the low pressure chamber 39 by way of a pressure sensitive orifice 45 and passage 46. The passage 46 is formed so as to extend across and through the low pressure chamber 39 and is closed at an open end by means of a plug 47. The low pressure chamber 39 is thus connected to a low pressure chamber side, i.e., the reservoir 91 by way of the passage 46, the orifice 45, the passage 43 and the drain passage 19.

With such a structure, working fluid discharged by the pump 92 is conducted through the inlet passage 20 to the first pressure chamber 15 and then to the outlet passage 8 through the through hole 13, passage 10 and the control orifice 9.

In this instance, the movable sleeve 37 is normally held at the first axial end portion 37a in contact with the connector 7 under the bias of the spring 38. Further, the valve spool 14 is urged toward the first pressure chamber 15 side by the control spring 17 and closes, by means of its peripheral portion, i.e., the land portion 18, the through hole 40 in communication with the drain passage 19, so that all the discharge of working fluid having been introduced to the first pressure chamber 15 is conducted through the control orifice 9 to the actuator 90. On the other hand, when the rotation speed of the pump 92 increases to increase the discharge of working fluid and therefore the flow rate of fluid introduced into the first pressure chamber 15 increases, the working fluid in the first pressure chamber 15 is conducted to the outlet passage 8 under flow restriction of the control orifice 9, while on the other hand the valve spool 14 is moved rightward in accordance with the pressure differential across the control orifice 9 as shown in FIG. 1 until the control spring 17 is compressed to a predetermined length of L1, thus opening the through hole 40 in communication with the drain passage 19 and circulating the surplus of working fluid back to the reservoir 91 through the through hole 40 and the drain passage 19.

In this instance, according to the present invention, the movable sleeve 37 having the through holes 40 and 41 communicable with the drain passage 19 and the inlet passage 20, respectively, is installed in the valve spool accommodation hole 5 around the valve spool 14. Further, the movable sleeve 37 has the first axial end portion 37a associated with the first pressure chamber 15 and the second axial end portion 37b associated with the low pressure chamber 39, and is urged by the spring 38 toward the first pressure chamber 15 side. Accordingly, when the pressure within the first pressure chamber 15 is low, the first axial end portion 37a of the movable sleeve 37 is brought into contact with the connector 7 under the bias of the spring 38, thus locating the through holes 40 and 41 at positions where they are substantially in alignment with the drain passage 19 and the inlet passage 20, respectively. On the other hand, when the pressure in the first pressure chamber 15 is high, the movable sleeve 37 is driven toward the second pressure chamber 16 side against the bias of the spring 38 and moved into a position where a shoulder portion 48 provided to the outer circumferential periphery of the movable sleeve 37 is abutted upon or engaged with a stepped portion 49 provided to the inner cicumferential periphery of the valve spool accommodation hole 5 (refer to FIG. 2). Accordingly, the movable sleeve 37 is moved to change the position of the through hole 40 relative to the drain hole 19 and the spool valve 14, thus causing the valve spool 14 to compress the control spring 17 further into the length of L2 as shown in FIG. 2. The valve spool 14 is moved depending upon the balancing of the spring force of the control spring 17, plus the force resulting from the pressure within the second pressure chamber 16 and the force resulting from the pressure within the first pressure chamber 15, for controlling fluid flow.

On the other hand, when the actuator 90 is in an inoperative condition, that is, when the steering wheel is in a neutral position, the working oil pressure within the outlet passage 8 becomes lower. Thus, in order to maintain the pressure differential across the control orifice 8 constant, the valve spool 14 is moved toward the second pressure chamber 16 side against the bias of the control spring 17 within the second pressure chamber 16, thus increasing the opening area of the through hole 40 in communication with the drain passage 19. By this, most of the working oil introduced into the first pressure chamber 15 through the inlet passage 20 is made to flow into the drain passage 19 by way of the through hole 40, thus making lower the pressure within the pump and reducing the working load of the pump.

Simultaneously, the pressure in the outlet passage 8 becomes lower in response to an inoperative condition of the actuator 90 and the valve spool 14 increases the opening area of the through hole 40 in communication with the drain passage 19. The pressure within the first pressure chamber 15 thus becomes lower. By this, the movable sleeve 37, subjected to the pressure in the first pressure chamber 15, is caused to move toward the first pressure chamber 15 side under the bias of the spring 38 and stops at the position where the first axial end portion 37a of the movable sleeve 37 is abutted upon the connector 7.

Accordingly, when the valve spool 14 assumes a position for maintaining the pressure differential across the control orifice 9 constant, i.e., the position where the force resulting from the pressure in the first pressure chamber 15 and acting on the valve spool 14 balances with the force resulting from the pressure in the second pressure chamber 16 plus the force of the spring 17, acting on the valve spool 14, the relative position of the through hole 40 with respect to the valve spool 14 changes by the amount corresponding to movement of the movable sleeve 37 toward the first pressure chamber 15 side. Therefore, the opening area of the through hole 40 which is in communication with the drain passage 19 and uncovered by the valve spool 14, increases further.

Therefore, when the actuator 90 is in an inoperative condition in which it does not require any working fluid, the working fluid supplied to the first pressure chamber 15 is returned from the through hole 40 of the movable sleeve 37, which has an increased opening area, to the reservoir 91 through the through hole 40 and the drain passage 19. Accordingly, the pump 92 which supplies working oil to the first pressure chamber 15 through the inlet passage 20 and the through hole 41, is caused to lower the discharge pressure, thus making it possible to lower its work load and thereby save energy.

Further, since the movable sleeve 37 is installed in the valve spool accommodation hole 5 around the valve spool 14, the flow control valve is not made particularly longer.

Figure 8:
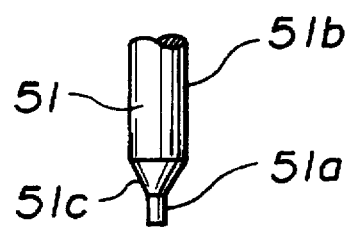
FIG. 8 is an enlarged fragmentary view of a control pin employed in the flow control valve of FIG. 4.
Figure 9:
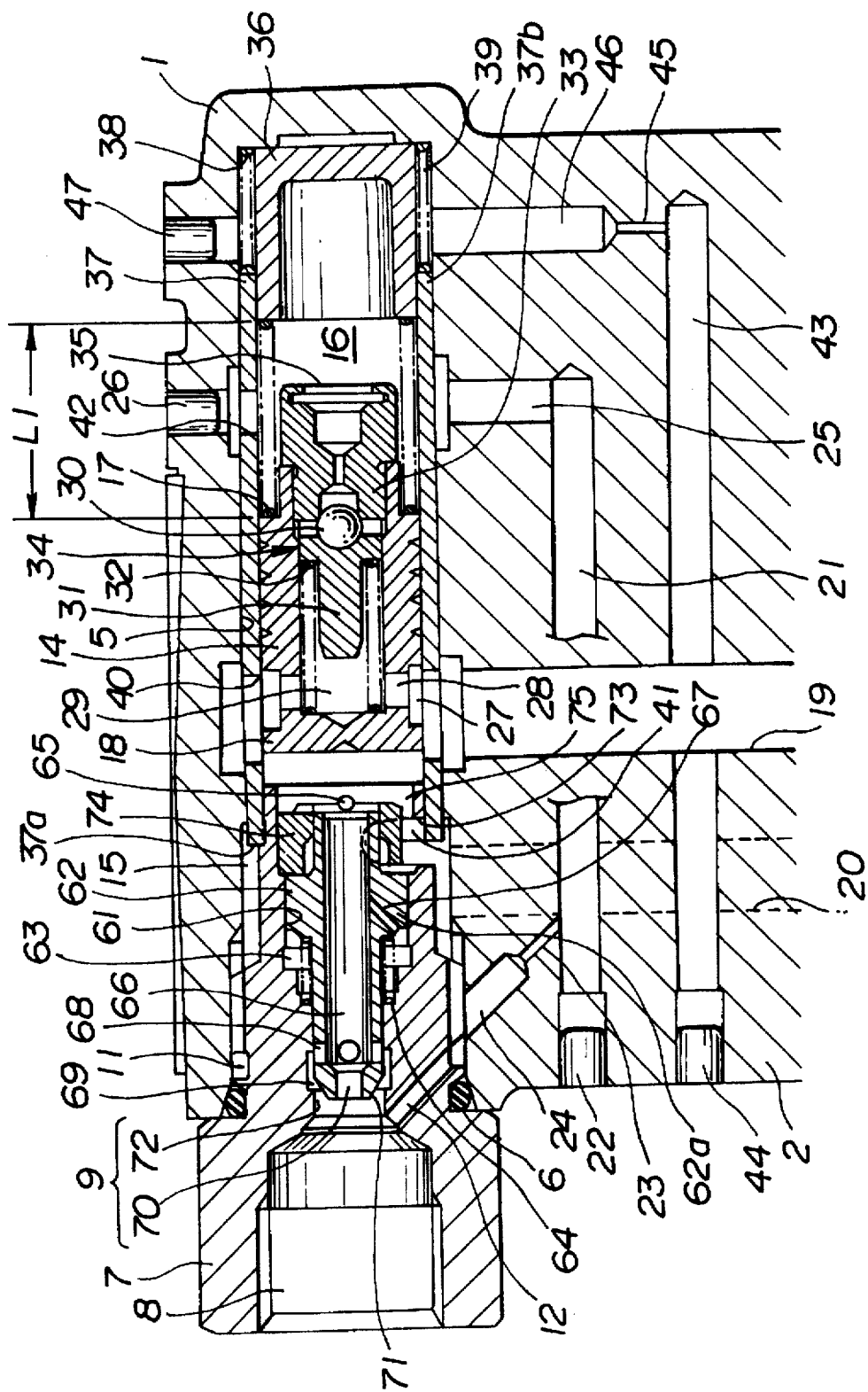
FIG. 9 is a view similar to FIG. 1 but shows a further embodiment of the present invention.
Figure 10:
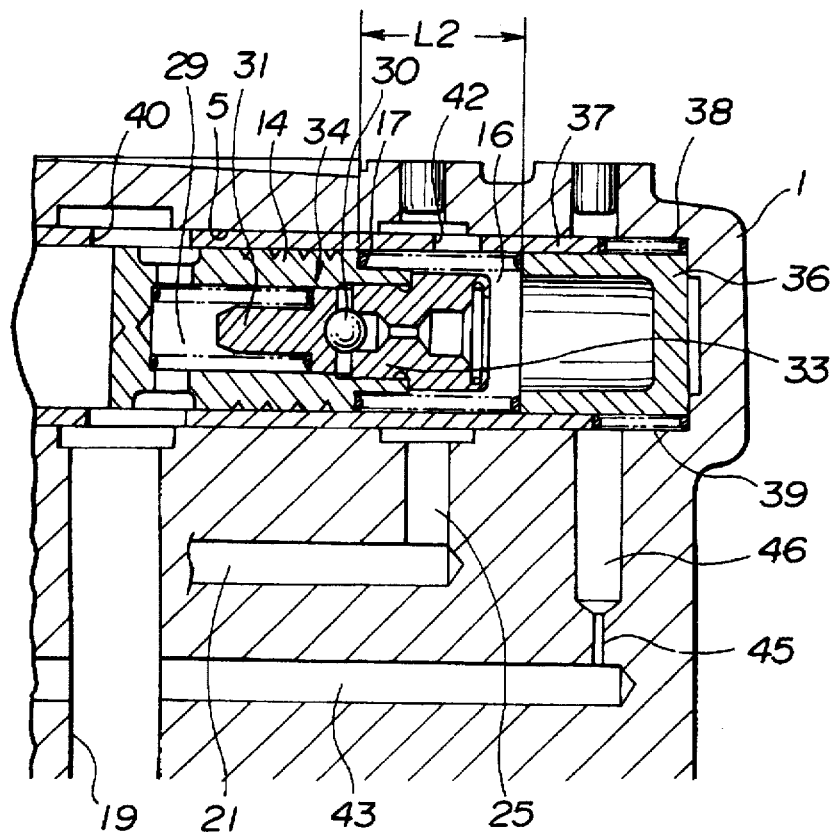
FIG. 10 is a fragmentary sectional view of the flow control valve of FIG. 9 and shows the flow control valve in a different operating condition.

Referring to FIGS. 4 to 8 inclusive, another embodiment of the present invention will be described. This embodiment is substantially similar to the previous embodiment of FIGS. 1 to 3 except that it is provided with, in place of the abutment 48 and stopper 49 in the previous embodiment, a control unit 50 for controlling movement of the movable sleeve 37 toward the second pressure chamber 16 side. The control unit 50 includes a control pin 51 which protrudes into the first pressure chamber 15 for contact with the inner peripheral surface of the through hole, and a solenoid 53 for driving a shaft 52 to which the control pin 51 is attached. As shown in FIG. 8, the control pin 51 has a larger diameter portion 51a and a smaller diameter portion 51b which are concentric with each other, and a tapered surface 51c between the larger diameter portion 51a and the smaller diameter portion 51b. Further, the solenoid 53 is connected to a control circuit 54 to be energized in response to a vehicle speed signal, i.e., a signal representative of vehicle speed.

Figure 4:
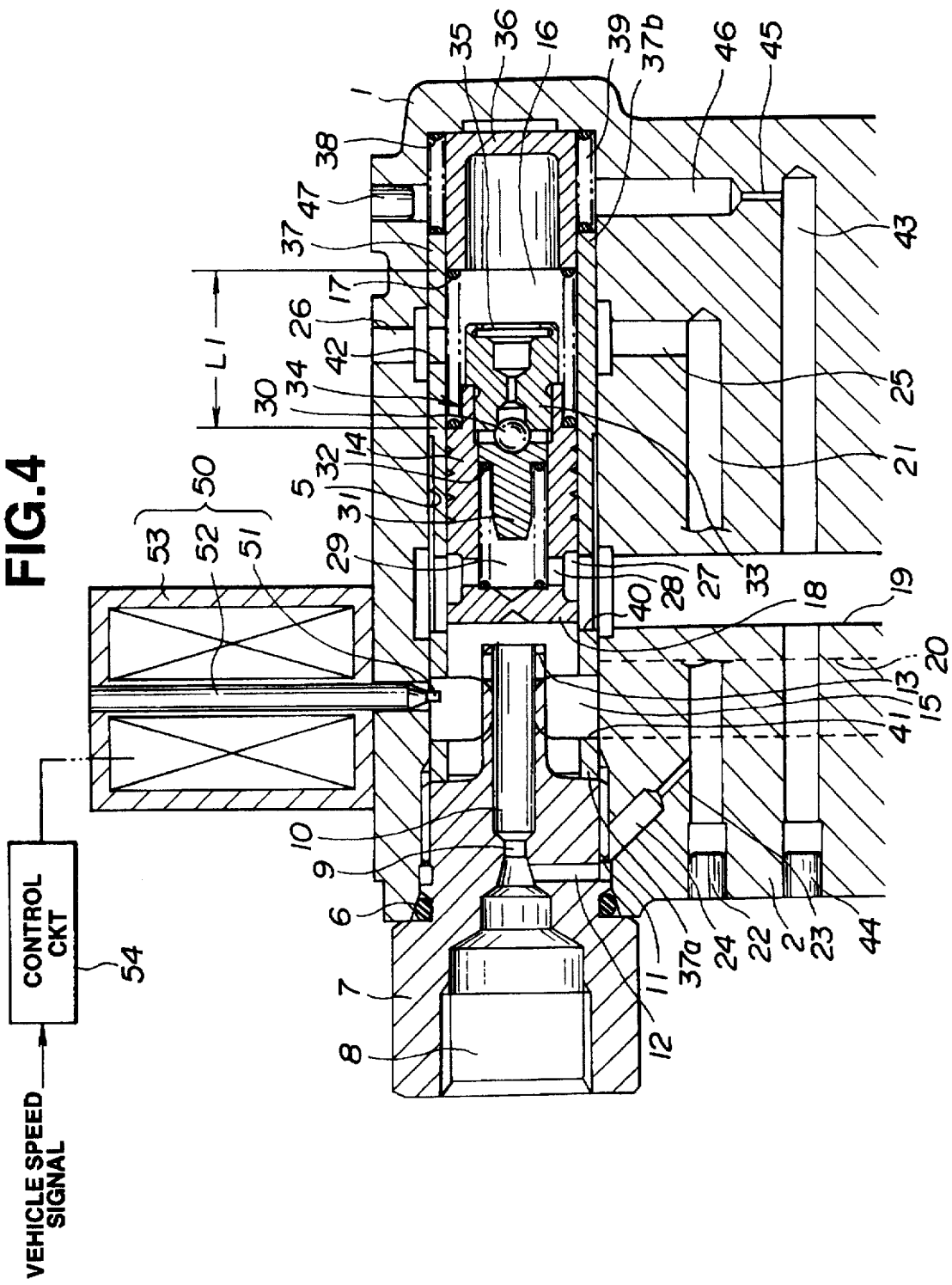
FIG. 4 is a view similar to FIG. 1 but shows another embodiment of the present invention.

When the pressure in the first pressure chamber 15 is low, the flow control valve is put in the operating condition shown in FIG. 4. In this operating condition, the flow rate of fluid passing through the control orifice 9 is controlled as represented by the line A-B of the graph of FIG. 7.

Figure 5:
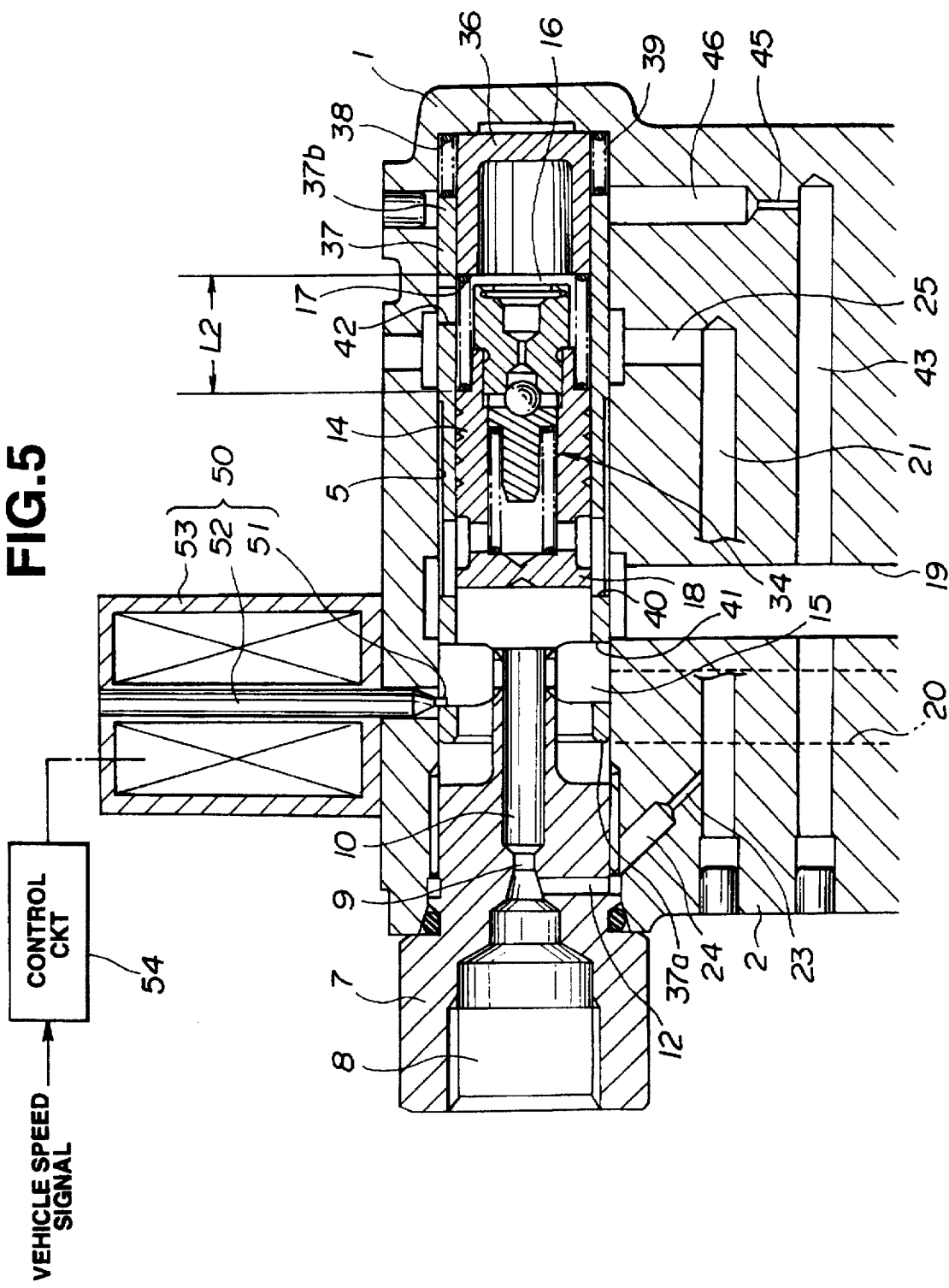
FIGS. 5 and 6 are views similar to FIG. 4 but shows the flow control valve in different operating conditions.
Figure 6:
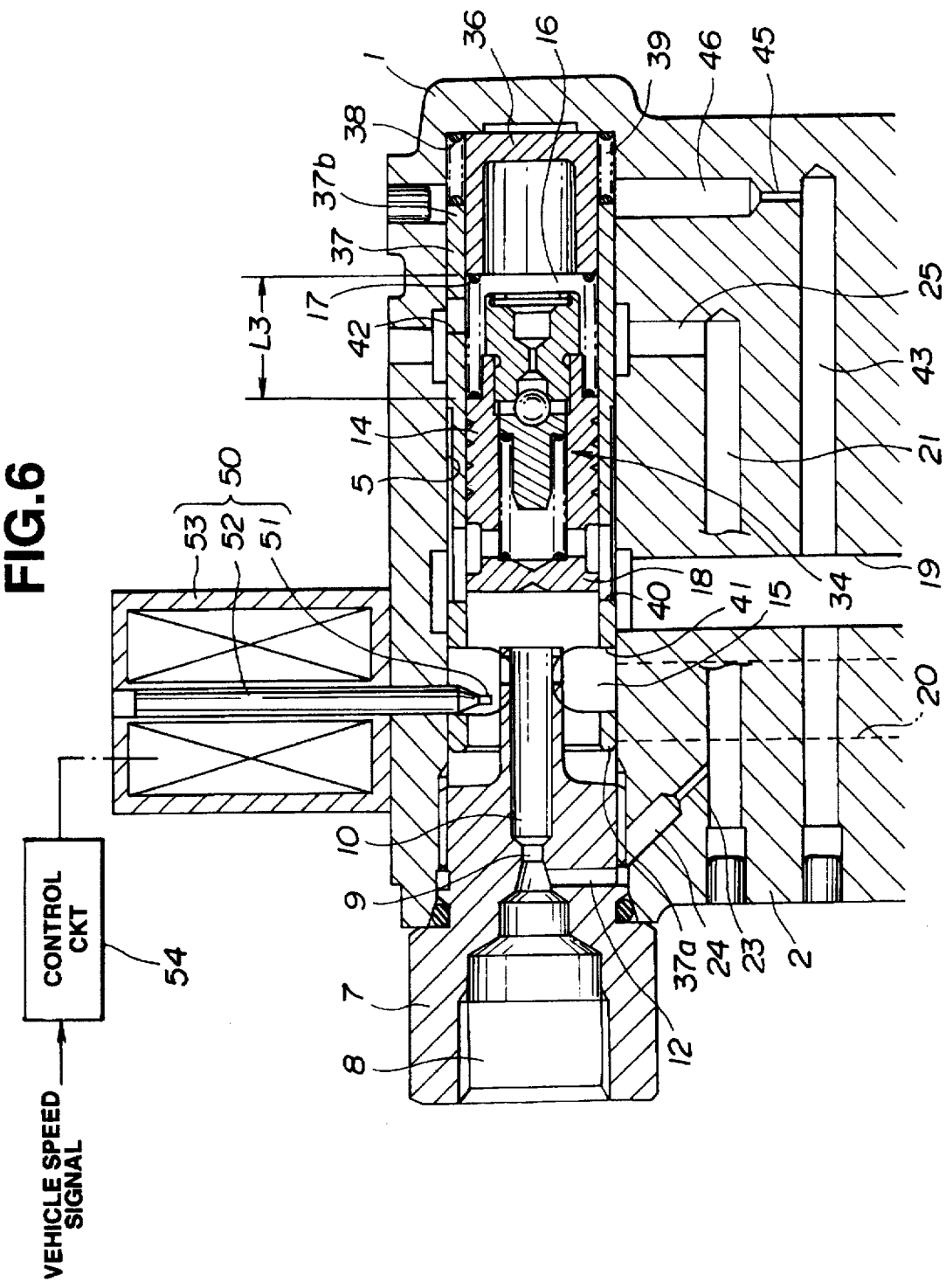
Figure 7:
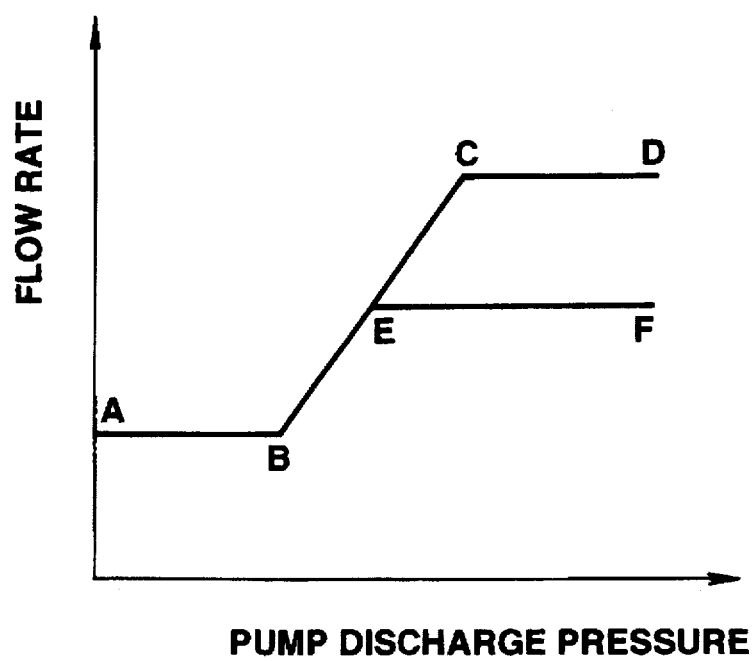
FIG. 7 is a graph depicting a flow control characteristic of the flow control valve of FIG. 4.

When the pressure in the first pressure chamber 15 exceeds beyond a predetermined value, the flow control valve is put in the operating condition shown in FIG. 5. In this operating condition, the flow rate of fluid passing through the control orifice 9 is represented by the line C-D of the graph of FIG. 7. In this instance, the movable sleeve 37 is brought into contact with the control pin 51 of the control unit 50 to restrict movement of the movable sleeve 37. That is, movement of the movable sleeve 37 toward the second pressure chamber 16 side is controlled by the control unit 50. The control unit 50 is controlled by the control circuit 54 in accordance with vehicle speed. When the vehicle speed is equal to or lower than a predetermined value, the control pin 51 assumes a retracted position as shown in FIGS. 4 and 5, though the smaller diameter portion 51 of the control pin 51 is protruded into the first pressure chamber 15. When the vehicle speed exceeds beyond a predetermined value, i.e., at high speed, the control pin 51 is moved forward so as to make the larger diameter portion 51b of the control pin 51 protrude into or be positioned in the first pressure chamber 15. Due to this, the movable sleeve 37 is driven by the tapered surface 51c toward the first pressure chamber 15 side and moved from a position where it is stopped by the smaller diameter portion 51a of the control pin 51 to a position where it is stopped by the larger diameter portion 51b of the control pin 51. Thus, the movable sleeve 37 is positioned a little closer to the first pressure chamber 15 side as compared with that shown in FIG. 5.

Therefore, the through hole 40 of the movable sleeve 37 is moved toward the first pressure chamber 15 side, so the relative position of the through hole 40 of the movable sleeve 37 with respect to the valve sleeve 14 is varied. Accordingly, the valve spool 14 is caused to move by the balancing of the force resulting from the pressure in the first pressure chamber 15 and the force resulting from the pressure in the second pressure chamber 16 plus the control spring 17 of the length of L3, and performs control of flow rate of fluid. That is, when the fluid pressure to be conducted to the first pressure chamber 15 is equal to that in the case the movable sleeve 37 is stopped by the smaller diameter portion 51b of the control pin 51, the through hole 40 in communication with the drain passage 19 is opened increasingly by an amount corresponding to movement of the movable sleeve 37 toward the first pressure chamber 15 side, thus increasing the flow rate of fluid to be drained to the drain passage 19. Therefore, the flow rate of fluid to be conducted to the outlet passage 8 is decreased and regulated to such one that corresponds to vehicle speed, and is represented by the line E-F of the graph of FIG. 7.

In this manner, the operation of the control unit 50 is controlled in accordance with a vehicle speed signal, and movement of the movable sleeve 37 is stopped by either the larger diameter portion 51b or the smaller diameter portion 51a of the control pin 51. Therefore, it becomes possible to supply a maximum flow rate of fluid to the actuator of the power steering system and thereby obtain a sufficiently large steering operation assisting force at low-speed running of a vehicle, while decreasing the flow rate of fluid to be supplied to the actuator to decrease the steering operation assisting force and thereby attain driving stability at high-speed running in which the frictional resistance of road surface to tire is small. The maximum flow rate of fluid to be supplied to the actuator can be variably and arbitrarily controlled by the control unit 50, and therefore can be regulated to an optimum value in accordance with vehicle speed.

Referring to FIGS. 9 to 12 inclusive, a further embodiment of the present invention will be described. In this embodiment, the connector 7 has a stepped hole 61 for providing communication between the outlet passage 8 and the inside of the valve spool accommodation hole 5. A second valve spool 62 which is hollow and stepped, is slidably installed in the stepped hole 61. The second valve spool 62 is urged by a spring 64 which is accommodated in an intermediate pressure chamber 63 formed between the outer circumferential periphery of the second valve spool 62 and the stepped hole 61, toward the first pressure chamber 15 side. The second valve spool 62 is prevented from slipping off from the stepped hole 61 by means of a pin 65 secured to the connector 7. The hollow inside of the second valve spool 62 is adapted to constitute a passage 66 in communication with the first pressure chamber 15. The passage 66 is also communicated with the intermediate pressure chamber 63 through an inclined through hole 67 formed in a flange portion 62a of the secondary valve spool 62. The passage 66 is also communicated with a peripheral groove 69 formed in an inner peripheral wall defining the stepped hole 61, through a radial through hole 68 formed in the second valve spool 61. Further, an end portion of the secondary valve spool 62 on the outlet passage 8 side is formed with a main orifice 70 and a tapered surface 71 which tapers toward the outlet passage 8. The tapered surface 71 cooperates with a corner portion of the peripheral groove 69 to form a sub-orifice 72. Accordingly, the sub-orifice 72 is disposed in parallel with the main orifice 70. An orifice unit 9 for restricting the flow rate of fluid to be supplied to the outlet passage 8 is constituted by the main orifice 70 and the sub-orifice 72. The connector 7 is formed with a peripheral groove 11 and an inclined through hole 12 having a radially outer end communicated with the peripheral groove 11 and a radially inner end communicated with the outlet passage 8. The connector 7 is further formed with a cut or notch 73 at an end located on the first pressure chamber 15 side. The notch 73 is located adjacent to or associated with the inlet passage 20. The inner peripheral wall defining the stepped hole 61 has attached thereto, at a location adjacent the notch 73, a guide member 74 which supports an end portion of the second valve spool 62. A restricted flow passage section 75 is defined by the outer peripheral surface of the guide member 74 and the inner peripheral surface of the stepped hole 61. The through hole 41 in this embodiment is formed by an axial opening at an end of the movable sleeve 37 and is always communicated with the inlet passage 20.

Figure 11:
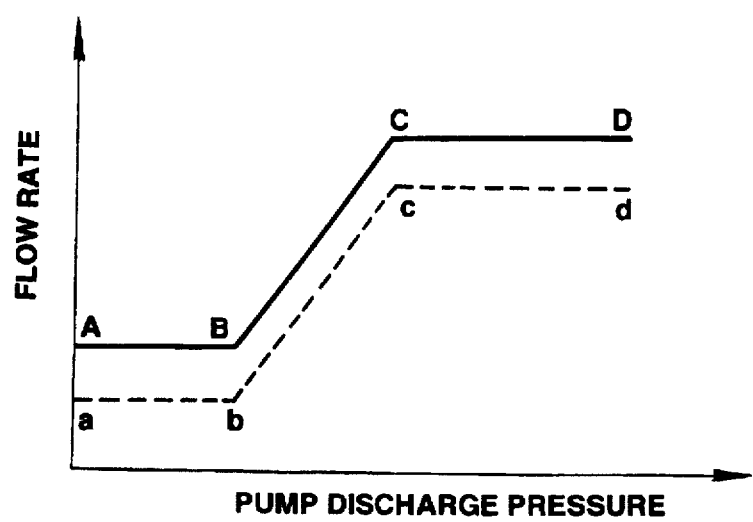
FIG. 11 is a graph depicting a flow control characteristic of the flow control valve of FIG. 9.
Figure 12:
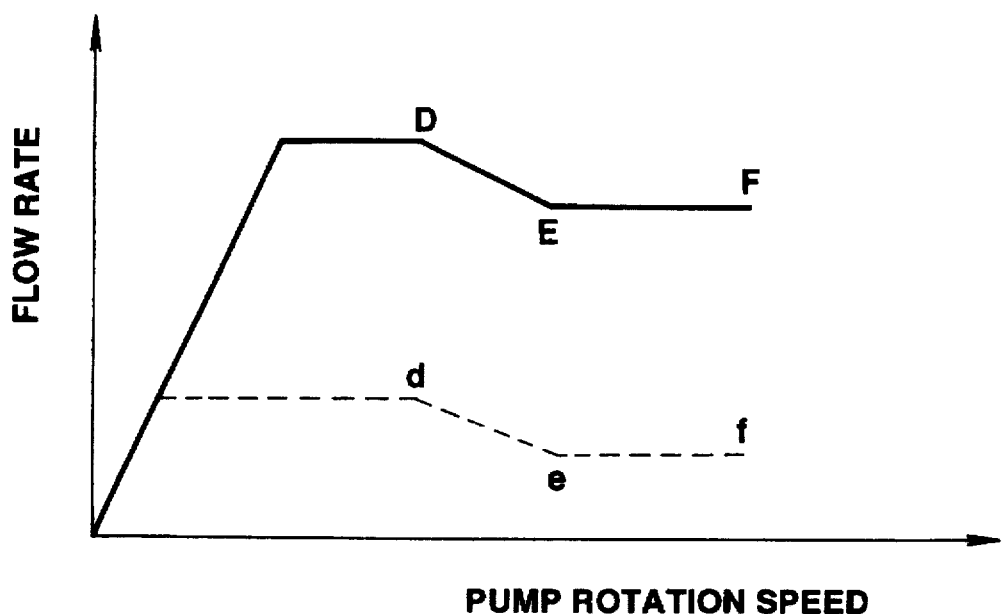
FIG. 12 is a graph depicting another flow control characteristic of the flow control valve of FIG. 9.

With this structure, working fluid discharged by the pump 92 is conducted to the first pressure chamber 15 through the inlet passage 20, the opening 41 and the restricted flow passage section 75 and then to the outlet passage 8 through the passage 66 of the second valve spool 62, the main orifice 70 and the sub-orifice 72. The relation between flow rate of fluid passing through the control orifice unit 9 consisting of the main orifice 70 and the sub-orifice 72 and pump discharge pressure (pump internal pressure) is depicted by the lines A-B, B-C and C-D of the graph of FIG. 11. This characteristic is substantially similar to that described as above. The lines a-b, b-c and c-d represent the performance characteristic which are obtained when the speed of rotation of an associated pump is high. Further, the relation between the flow rate of fluid passing through a control orifice unit consisting of a main orifice and a sub-orifice and the rotation speed of pump is depicted by the lines in the graph of FIG. 12. That is, when the pump 92 is driven to rotate at high speed to increase its output, the flow rate of fluid conducted to the inlet passage 20 is increased and a pressure differential is created across the restricted flow passage section 75. Therefore, the pressure of working fluid before passing the restricted flow passage section 75 acts upon the flange portion 62a of the second valve spool 62, thus causing the second spool valve 62 to move leftward in FIG. 9 against the bias of the spring 64 and thereby causing the sub-orifice 72 formed between the tapered surface 71 of the second valve spool 62 and the corner portion of the peripheral groove 69 to decrease in opening area. By the thus decreased opening area of the sub-orifice 62, the communication between the passage 66 and the outlet passage 8 through the through hole 68 and the sub-orifice 72 is restricted, and the flow rate of fluid passing through the control orifice unit 9 is decreased gradually as represented by the line D-E of the graph of FIG. 12 (or by the line d-e when the pump internal pressure is low). When the discharge pressure of the pump increases further, the second valve spool 62 is moved further leftward to close the sub-orifice 72 arranged in parallel with the main orifice 70. Therefore, the control orifice unit 9 is constituted by only the main orifice 60. The actual opening area of the control orifice unit 9 is thus decreased, and the flow rate of fluid passing through the control orifice unit 9 is represented by the line E-F of the graph of FIG. 12 (or by the line e-f when the pump internal pressure is low). In the meantime, when the pressure differential across the restricted flow passage section 75 is zero, the second valve spool 62 is caused to move rightward under the bias of the spring 64 accommodated in the intermediate pressure chamber 63 until its end on the first pressure 15 side abuts upon the stopper pin 65 to be stopped thereby. In this manner, the flow control valve can effect such a flow control characteristic as represented by the graphs of FIGS. 11 and 12, and can supply, at low-speed running or at stoppage of a vehicle, a maximum flow rate of fluid to an actuator of a power steering system for thereby obtaining a sufficiently large steering operation assisting force and supply, at high-speed running in which the resistance of road surface to tire is small, a decreased flow rate of fluid to the actuator for thereby decreasing the steering operation assisting force and obtaining steering and driving stability. Except for the above, this embodiment is substantially similar to the previous embodiment of FIGS. 1 to 3 and produce substantially the same effect.

Figure 13:
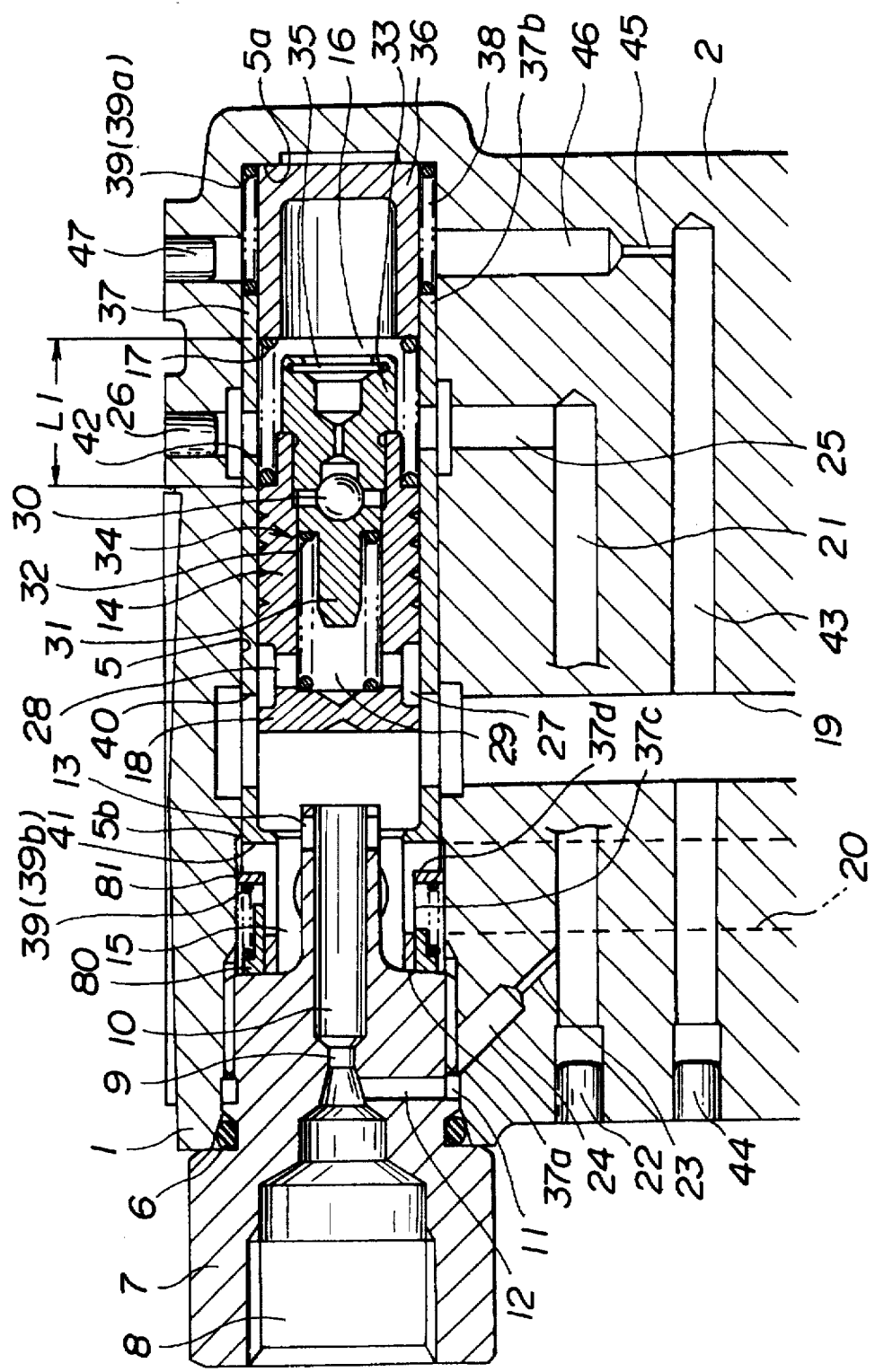
FIG. 13 is a view similar to FIG. 1 but shows a further embodiment of the present invention.
Figure 14:
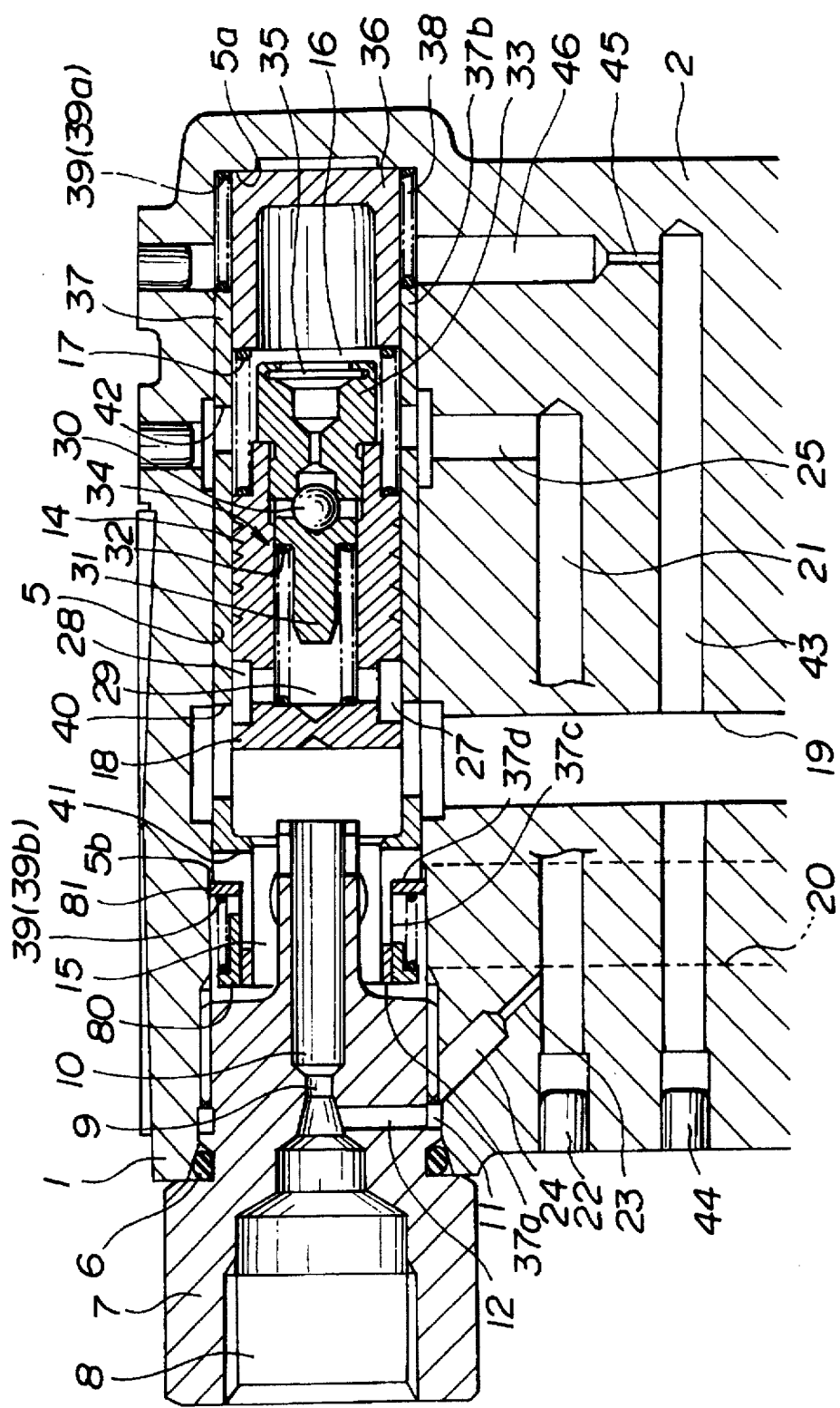
FIGS. 14 to 17 are views similar to FIG. 13 but show the flow control valve in different operating conditions.
Figure 15:
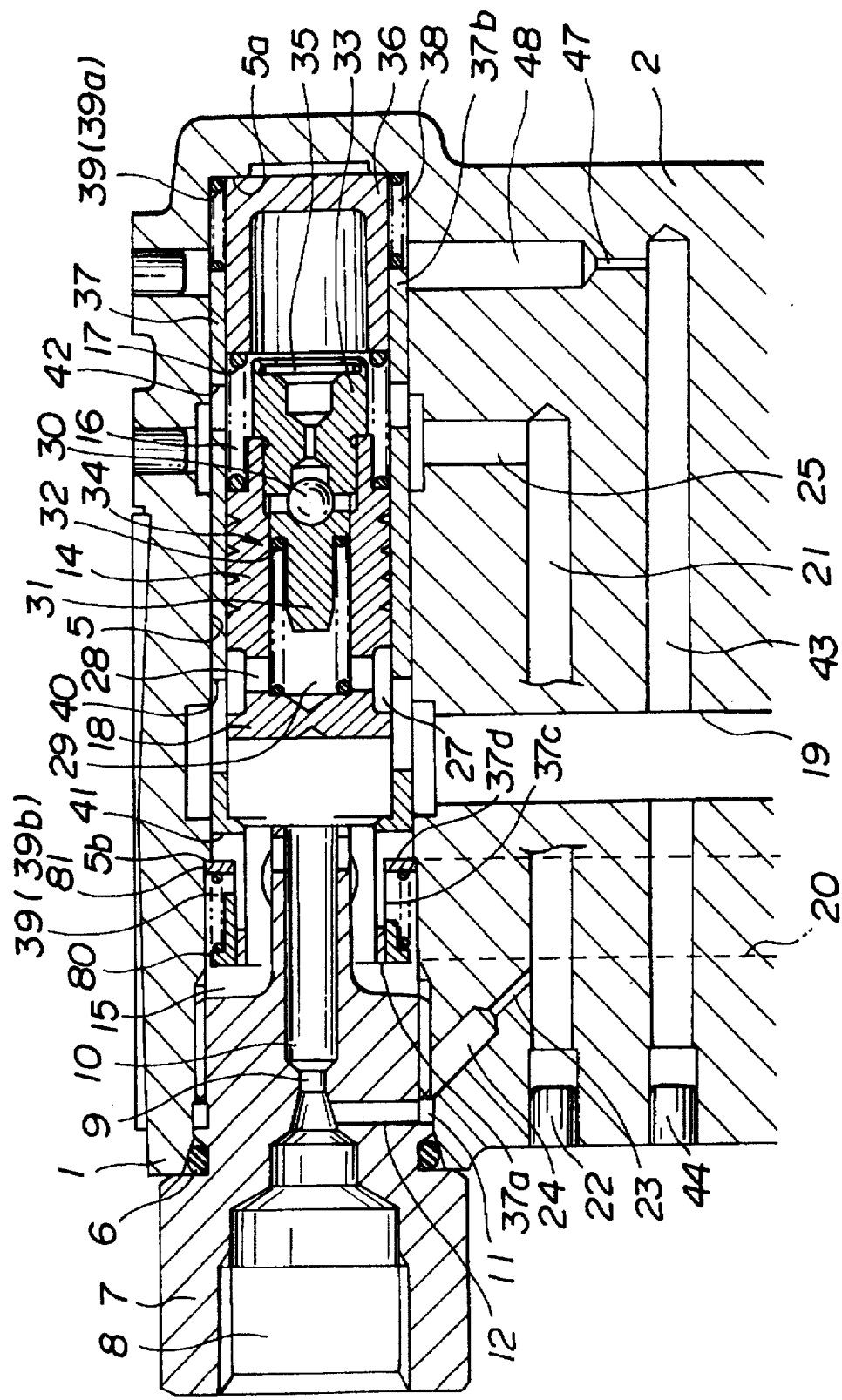
Figure 16:
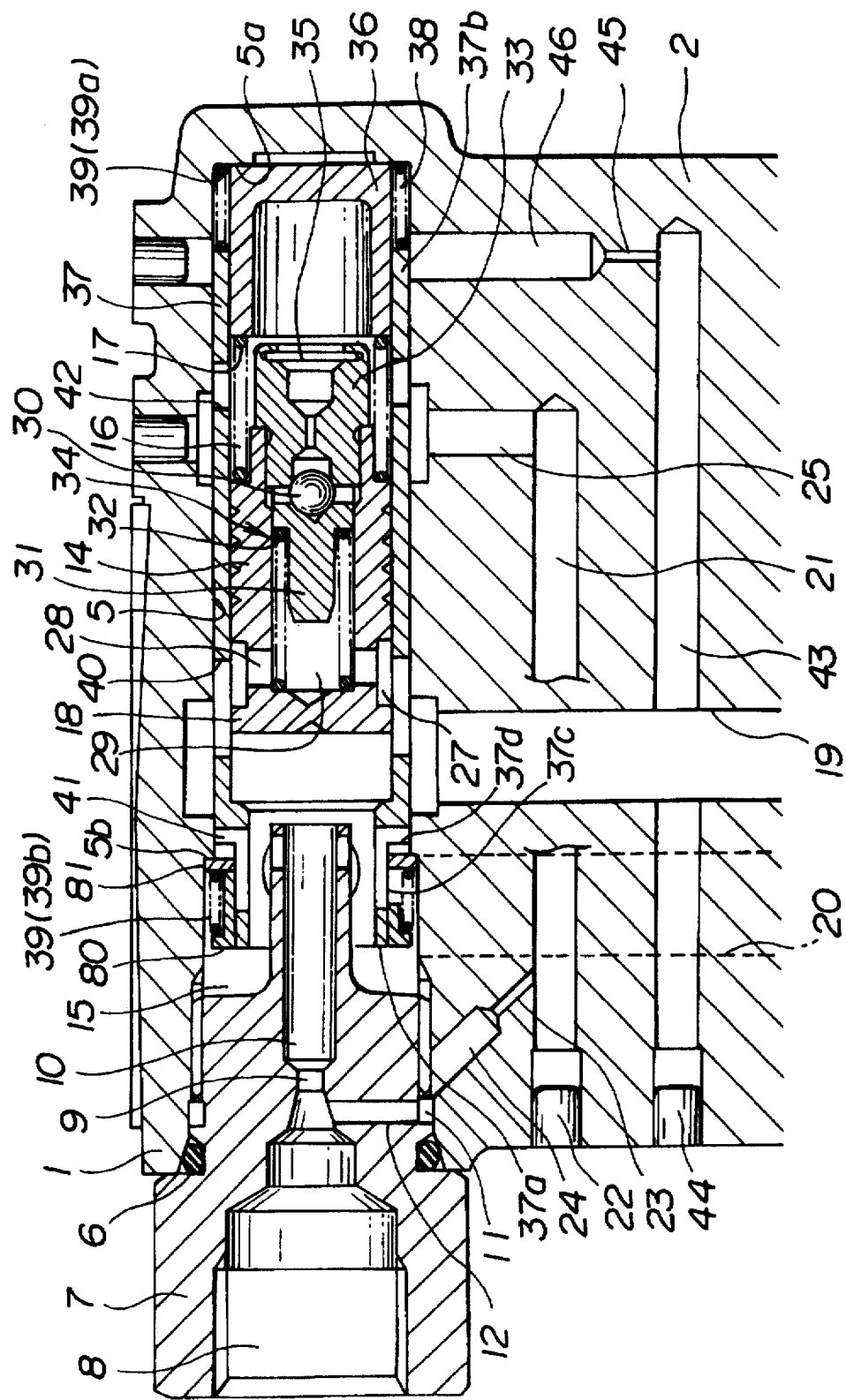
Figure 17:
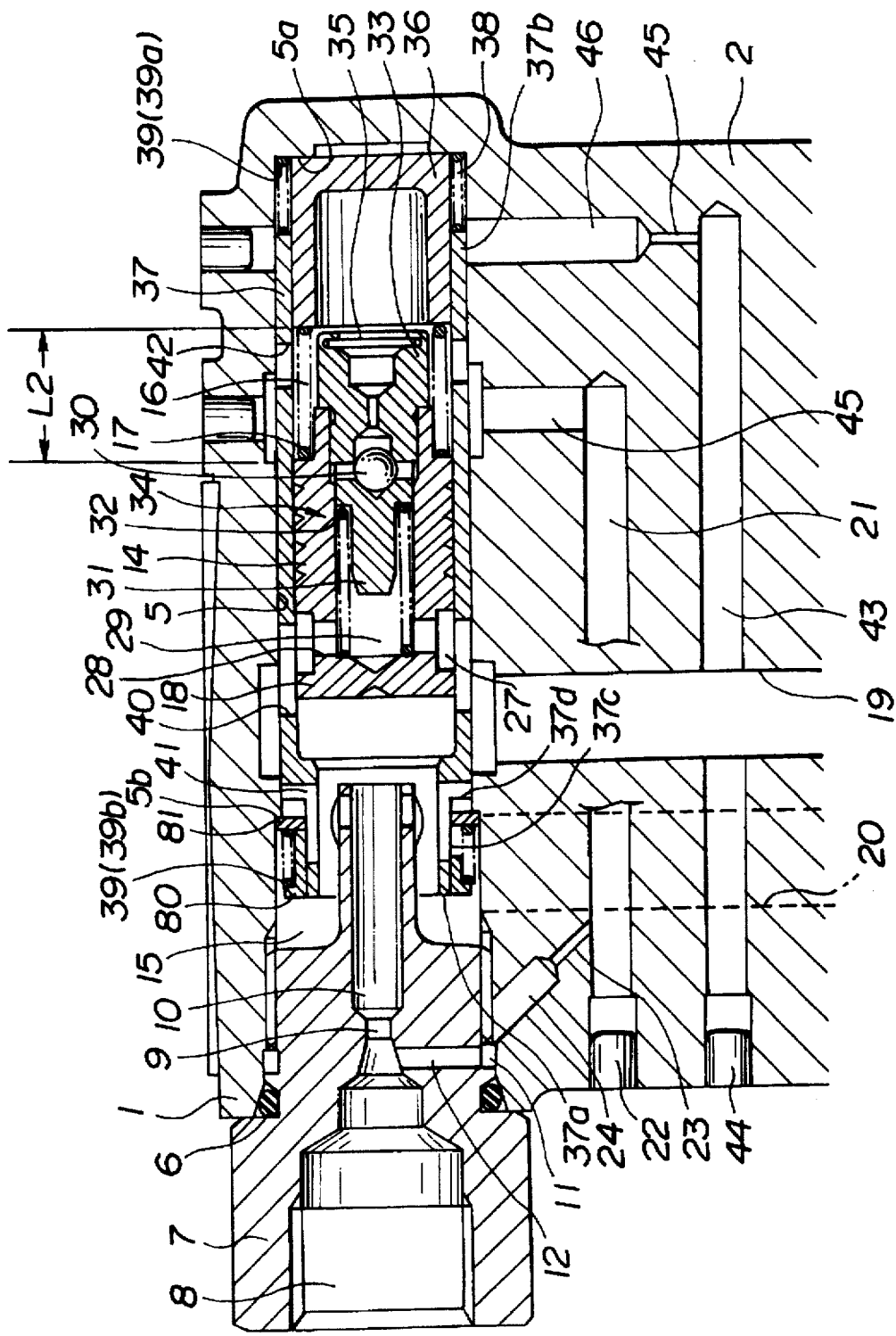

Referring to FIGS. 13 to 18, a further embodiment of the present invention will be described. In this embodiment, a spring unit 39 is provided for urging the movable sleeve 37 toward the first pressure chamber 15 side and is comprised of a first spring 39a disposed in the low pressure chamber 38 and a second spring 39b provided to the first axial end portion 37a of he movable sleeve 37. The first spring 39a is disposed in a predetermined loaded state between the bottom face 5a of the valve spool accommodation hole 5 and the second axial end portion 37b. The second spring 39b is disposed in a predetermined loaded state between a stationary retainer ring 80 secured to a smaller diameter section 37c of the first axial end portion 37a of the movable sleeve 37 and a movable stopper or retainer ring 81 which is movable a predetermined length in the axial direction of the movable sleeve 37. The movable retainer ring 81 is installed on the smaller diameter section 37c of the movable sleeve 37 in such a manner as to be movable toward the stationary retainer ring 80 side. The movable retainer ring 81, as shown in FIG. 13, is held in contact with a shoulder section 37c of the first axial end portion 37a of the movable sleeve 37 and stopped thereat when the movable sleeve 37 is positioned nearest to the first pressure chamber 15. Further, in this condition, the movable retainer ring 81 is spaced apart from a shoulder portion 5b of the valve spool accommodation hole 5 and is not in contact with the shoulder portion 5b. Accordingly, when the movable sleeve 37 is in the position shown in FIG. 13, the first spring 39a applies to the movable sleeve 37 a biasing force directed to the first pressure chamber 15 side, but the second spring 39b does not apply to the movable sleeve 37 any biasing force causative of movement of the movable sleeve 37. In the meantime, it is after the movable sleeve 37 is moved toward the second pressure chamber 16 side (i.e., low pressure chamber 38 side) by the pressure in the first pressure chamber 15 to bring the movable retainer ring 81 in contact with the shoulder portion 5b of the valve spool accommodation hole 5 that the second spring 39b of the spring unit 39 can apply an effective biasing force to the movable sleeve 37. Except for the above, this embodiment is substantially similar to the previous embodiment of FIGS. 1 to 3.

Figure 18:
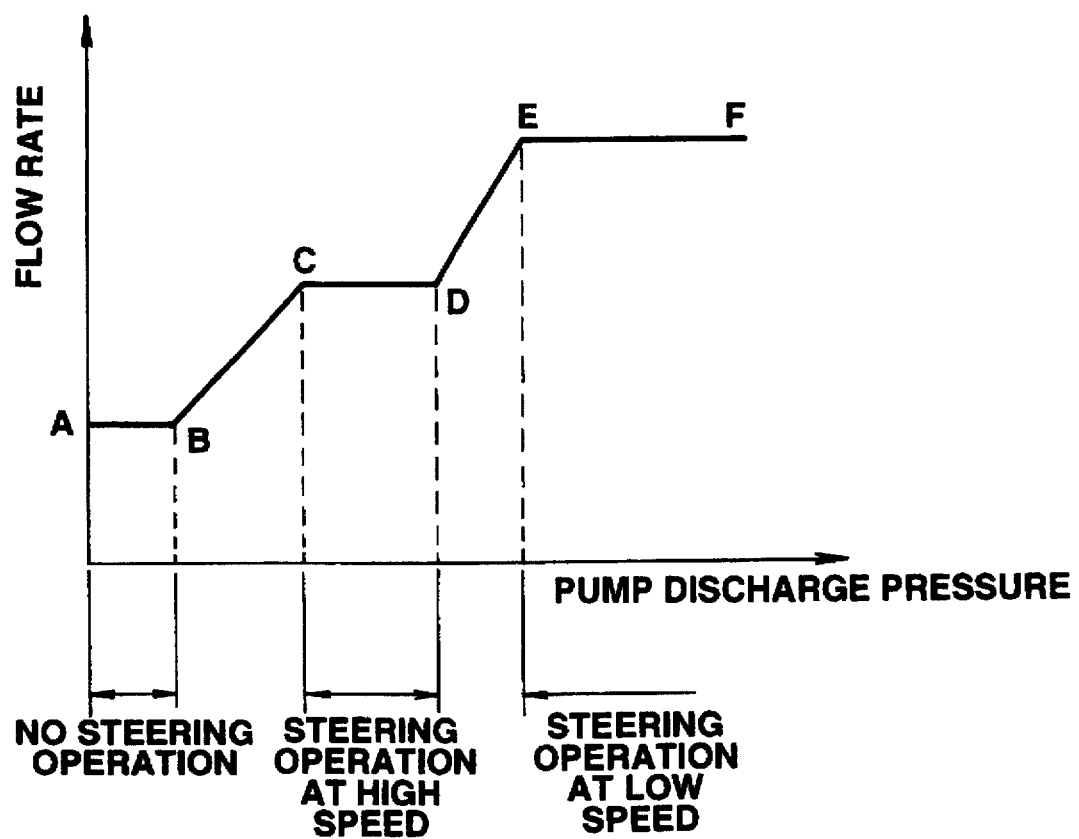
FIG. 18 is a graph depicting a flow control characteristic of the flow control valve of FIG. 13.

In operation, when the pressure in the first pressure chamber 15 is low, the flow rate of fluid passing through the control orifice 9 is represented by the line A-B of the graph of FIG. 18. This flow rate of fluid is supplied by way of the outlet passage to the power steering system when the power steering system does not require any steering operation assisting force. In this instance, the first spring 39a of the spring unit 39 attached to the movable sleeve 37 has an end in contact with the bottom face 5a of the valve spool accommodation hole 5. However, the movable retainer ring 41 is held in contact with the shoulder section 37d of the movable sleeve 37 and does not cause any spring force for urging the movable sleeve 37 axially thereof (refer to FIG. 13). Accordingly, the spring 38 is in a condition of producing a minimum spring force in a first stage for urging the movable sleeve 37 toward the first pressure chamber 15 side. In response to a steering effort applied to the power steering system, the pressure of working fluid conducted through the inlet passage 20 increases and therefore the pressure in the first pressure chamber 15 increases. When this is the case, the movable sleeve 37 is moved by the pressure in the first pressure chamber 15 toward the second pressure chamber 16 side (i.e., low pressure chamber 38 side) against the spring force of the spring unit 39. By this, the through holes 40 and 41 of the movable sleeve 37, though being kept communicated with the drain passage 19 and the inlet passage 20, respectively, are moved toward the second pressure chamber 16 side (i.e., low pressure chamber 38 side). That is, the relative positions of the through holes 40 and 41 with respect to the valve spool 14 are changed. Due to this, the valve spool 14 for maintaining the pressure differential across the control orifice 9 constant, comes to compress the control spring 17 further for carrying out its flow control (refer to FIG. 14). Accordingly, the valve spool 14 is moved based on a little larger spring force of the control spring 17 and the pressure differential across the control orifice 9. The flow rate of fluid passing through the control orifice 9 in this operating condition is represented by the line B-C of the graph of FIG. 18. In this instance, of the spring unit 39 attached to the movable sleeve 37, only the first spring 39a disposed in a loaded state between the bottom face 5a of the valve spool accommodation hole 5 and the second axial end portion 37b of the movable sleeve 37 effects a spring action, and therefore the spring unit 39 produces a spring force in a first stage (refer to FIG. 14). During the time until the pressure in the first pressure chamber 15 increases up to a predetermined value and the spring unit 39 produces a spring force in the stage after the first stage, that is, the movable retainer ring 81 is brought in contact with the shoulder portion 5b of the valve spool accommodation hole 5, the movable sleeve 37 is held in a position in which the pressure in the first pressure chamber 15 and the first stage spring force of the spring unit 39 (i.e., the spring force of only the first spring 39a) are balanced with each other and the through holes 40 and 41 of the movable sleeve 37 in that balanced position are held in communication with the drain passage 19 and the inlet passage 20, respectively (refer to FIG. 3). Under this condition, the valve spool 14 is moved based on the spring force of the control spring 17 and the pressure differential of the control orifice 9 in such a manner as to maintain the pressure differential across the control orifice 9 constant. The flow rate of fluid passing through the control orifice 9 in this operating condition is represented by the line C-D of the graph of FIG. 18. This flow rate of fluid is supplied to the power steering system in response to a steering operation when the vehicle is running at high speed. In this instance, only the first spring 39a is compressed until the movable retainer ring 81 supporting the second spring 39b is brought in contact with the shoulder portion 5b of the valve spool accommodation hole 5, and therefore the spring unit 39 produces a maximum spring force in the first stage (refer to FIG. 15). When the pressure in the first pressure chamber 15 increases further and a resulting force acting on the movable sleeve 37 increases beyond the first stage spring force of the spring unit 39, the movable spring 37 is moved away further from the first pressure chamber 15 against the spring force of the spring unit 39 in the next stage (refer to FIG. 16). Accordingly, the valve spool 14 compresses the control spring 17 further for the purpose of maintaining the pressure differential across the control orifice 9 constant, and therefore the load on the control spring 17 is increased further. By this, the spool valve 14 is moved based on the further increased spring force of the control spring 17 and the pressure differential across the control orifice 9. The flow rate of fluid passing through the control orifice 9 in this operating condition is represented by the line D-E of the graph of FIG. 18. In this instance, of the control valve unit 39, not only the first spring 39a but the second spring 39b produces a spring force since the movable retainer ring 81 with which one end of the second spring 39b contacts, is abutted upon the shoulder portion 5b of the valve spool accommodation hole 5 to compress the second spring 39b, and therefore the spring unit 39 produces a spring force in the second stage (refer to FIG. 16). When the pressure in the first pressure chamber 15 increases up to a predetermined value, the movable sleeve 37 compresses the spring unit 39, comprised of the first spring 39a and the second spring 39b) a maximum amount. Therefore, the movable sleeve 37 goes farthest away from the first pressure chamber 15 to make the through holes 40 and 41 come nearest to the second pressure chamber 16 side (i.e., lower pressure chamber 38 side) and is stopped at a position where the stationary retainer ring 80 is brought in contact with the movable retainer ring 81 which is held in contact with the shoulder portion 5b of the valve spool accommodation hole 5 and stopped thereat. Under this condition, the spool valve 37 compresses the control spring 17 to a predetermined length of L2 and is moved based on the balancing of the force resulting from the pressure in the first pressure chamber 15 and the spring force of the control spring 17, plus the force resulting from the pressure in the second pressure chamber 16, for performing flow control (refer to FIG. 17). The flow rate of fluid passing through the control orifice 9 in this operating condition is represented by the line E-F of the graph of FIG. 18. This is a maximum flow rate of fluid to be supplied to the power steering system. In this instance, both the first spring 39a and the second spring 39b are compressed maximally and therefore the spring unit 39 produces a maximum spring force which is applied to the movable sleeve 37 (refer to FIG. 17).

While the present invention has been described and shown as above, it is not for the purpose of limitation. For example, while the spring seat 36 is described and shown as being an independent part, it can be formed integral with the housing 1.

Further, while the control unit 50 has been described and shown as making two steps or two kinds of control, i.e., a control at low speed and a control at high speed, this is not for the purpose of limitation but can be modified to effect a multistep control or a stepless control by utilizing, for example, the tapered surface 51c.

What is claimed is:

1. A flow control valve comprising:

a housing having a valve spool accommodation hole;

a movable sleeve slidable in said valve spool accommodation hole;

a valve spool slidable in said movable sleeve and cooperating with said movable sleeve to divide said valve spool accommodation hole into a first pressure chamber and a second pressure chamber;

means for defining an inlet passage, a control orifice, an outlet passage and a drain passage communicating with said first pressure chamber such that said outlet passage communicates with said first pressure chamber through said control orifice;

first biasing means for urging said valve spool toward said first pressure chamber;

a passage providing communication between said outlet passage and said second pressure chamber such that said valve spool is movable in response to a pressure differential across said control orifice;

said valve spool being movable for variably controlling an opening area of a port portion of said drain passage so that a necessary flow rate of working fluid is supplied from said inlet passage to said outlet passage through said first pressure chamber and said control orifice while a surplus of working fluid is returned from said first pressure chamber to said drain passage;

said movable sleeve having a radial through hole for variably controlling communication between said port portion of said drain passage and said first pressure chamber;

means for defining a low pressure chamber axially aligned with said valve spool accommodation hole and located next to said second pressure chamber;

said movable sleeve having a first axial end portion disposed in said first pressure chamber and a second axial end portion opposite said first axial end portion and disposed in said low pressure chamber; and second biasing means for urging said movable sleeve toward said first pressure chamber so that said movable sleeve is movable relative to said valve spool, in response to a variation of pressure in said first pressure chamber, for varying the opening area of said port portion of said drain passage.

2. A flow control valve according to claim 1, wherein said valve spool is provided with relief valve means for relieving said second pressure chamber of pressure beyond a predetermined value by providing communication between said second pressure chamber and said drain passage.

3. A flow control valve according to claim 1, wherein said movable sleeve further has an opening through which said inlet passage communicates with said first pressure chamber.

4. A flow control valve according to claim 3, wherein said opening comprises a radial through hole formed in said movable sleeve.

5. A flow control valve according to claim 1, wherein said first axial end portion of said movable sleeve has a terminal section forming an external flange-like abutment portion, said valve spool accommodation hole being stepped to form an internal flange-like stopper portion, said abutment portion of said movable sleeve and said stopper portion of said valve spool accommodation hole being abuttingly engageable with each other to restrict axial movement of said movable sleeve toward said second pressure chamber.

6. A flow control valve according to claim 5, wherein said control orifice and said outlet passage are formed in a connector attached to said housing, said movable sleeve being abuttingly engageable with said connector under the bias of said second biasing means, said movable sleeve being movable between a first position abutting said connector and a second position where said abutment portion abuts said stopper portion, said connector constituting said means for defining said inlet passage and said control orifice.

7. A flow control valve according to claim 1, wherein said first biasing means comprises a first coil spring and a spring holder in the form of a hollow, cylindrical cup, said spring holder being installed in a blind end of said valve spool accommodation hole to define said low pressure chamber of an annular shape around its periphery, said first coil spring being disposed between said valve spool and an end of said spring holder, said second biasing means having a second coil spring disposed in said low pressure chamber and between said blind end of said valve spool accommodation hole and said second axial end portion of said movable sleeve, said spring holder constituting a portion of said means for defining a low pressure chamber.

8. A flow control valve according to claim 1, wherein said low pressure chamber communicates with said drain passage through a pressure sensitive orifice.

9. A flow control valve according to claim 1, further comprising control means for variably controlling a movable range of said movable sleeve.

10. A flow control valve according to claim 9, wherein said control means comprises an axially movable control pin abutting engageable with said movable sleeve, and a solenoid for driving said control pin to different axial positions.

11. A flow control valve according to claim 10, wherein said solenoid is controlled in response to a signal representative of vehicle speed.

12. A flow control valve according to claim 1, further comprising means for defining a second control orifice parallel to said first control orifice, said first control orifice having a fixed opening area, said second control orifice having an opening area varying in response to flow rate of fluid in said inlet passage.

13. A flow control valve according to claim 12, wherein said means for defining said second control orifice comprises a restricted flow passage section between said inlet passage and said first pressure chamber, and a second valve spool movable in response to a pressure differential across said restricted flow passage section for variably controlling an opening area of said second control orifice.

14. A flow control valve according to claim 1, further comprising third biasing means cooperating with said second biasing means for applying a biasing force to said movable sleeve which varies in response to movement of said movable sleeve toward said second pressure chamber.

15. A flow control valve according to claim 14, wherein said first biasing means comprises a first coil spring and a spring holder in the form of a hollow, cylindrical cup, said spring holder being installed in a blind end of said valve spool accommodation hole to define said low pressure chamber of an annular shape around its periphery, said first coil spring being disposed between said valve spool and an end of said spring holder, said second biasing means having a second coil spring disposed in said low pressure chamber and between said blind end of said valve spool accommodation hole and said second axial end portion of said movable sleeve, said spring holder constituting a portion of said means for defining a low pressure chamber, said first axial end portion of said movable sleeve having a smaller diameter section, a larger diameter section and a shoulder section between said smaller diameter section and a larger diameter section, said third spring means including a stationary retainer ring secured to said smaller diameter section of said movable sleeve to move therewith, a movable retainer ring installed on said smaller diameter section and movable between said stationary ring and said shoulder section, and a third spring interposed between said stationary retainer and said movable retainer for urging said movable retainer against said shoulder section, said third spring means further including a shoulder portion of said valve spool accommodation hole, wherein said movable retainer ring is abuttingly engageable with said shoulder portion of said valve spool accommodation hole when said movable sleeve moves a predetermined distance away from said first pressure chamber, and allows said third spring to apply a spring force to said movable sleeve in response to further movement of said movable sleeve away from said first pressure chamber.

* * * * *